United States Patent [19]

Rourke et al.

[11] Patent Number: 5,271,065
[45] Date of Patent: Dec. 14, 1993

[54] ELECTRONIC PRINTING SYSTEM FOR PRINTING SIGNATURES

[75] Inventors: John L. Rourke, Fairport; Peter M. Krist, Rochester, both of N.Y.

[73] Assignee: Xerox Corporation, Stamford, Conn.

[21] Appl. No.: 589,941

[22] Filed: Sep. 28, 1990

[51] Int. Cl.$^5$ .............................................. G06K 15/00
[52] U.S. Cl. ....................................... 382/1; 358/450; 395/117
[58] Field of Search ................... 382/44, 45, 41, 1; 358/450; 355/25, 54; 395/117

[56] References Cited

U.S. PATENT DOCUMENTS

| | | | |
|---|---|---|---|
| 4,334,765 | 6/1982 | Clark | 355/14 SH |
| 4,538,905 | 9/1985 | Griego et al. | 355/14 SH |
| 4,672,462 | 6/1987 | Yamada | 382/46 |
| 4,708,469 | 11/1987 | Bober et al. | 355/25 |
| 4,727,402 | 2/1988 | Smith | 355/14 SH |
| 4,731,637 | 3/1988 | Acquaviva et al. | 355/14 SH |
| 4,745,441 | 5/1988 | Maruta et al. | 355/14 R |
| 4,789,147 | 12/1988 | Berger et al. | 270/1.1 |
| 4,789,879 | 12/1988 | Murakami | 355/14 R |
| 4,809,039 | 2/1989 | Ishii | 355/14 R |
| 4,814,822 | 3/1989 | Acquaviva et al. | 355/14 SH |
| 4,819,029 | 4/1989 | Ito | 355/7 |
| 4,891,681 | 1/1990 | Fiske et al. | 355/322 |
| 5,051,843 | 9/1991 | Hayashi | 358/450 |
| 5,105,283 | 4/1992 | Forest et al. | 358/450 |

Primary Examiner—Michael T. Razavi
Assistant Examiner—Steven P. Klocinski
Attorney, Agent, or Firm—Frederick E. McMullen

[57] ABSTRACT

An automatic signature printing process for an electronic printing system having a source of signature sheets, a programmer to program the system to print jobs including signatures; an input scanner for scanning and converting the documents to electronic images; and a controller to re-order the electronic images to print two electronic images separated by a gutter on each side of the signature sheets, the controller determining from the number of originals and the number of electronic images on each signature the total number of signatures to be printed.

5 Claims, 22 Drawing Sheets

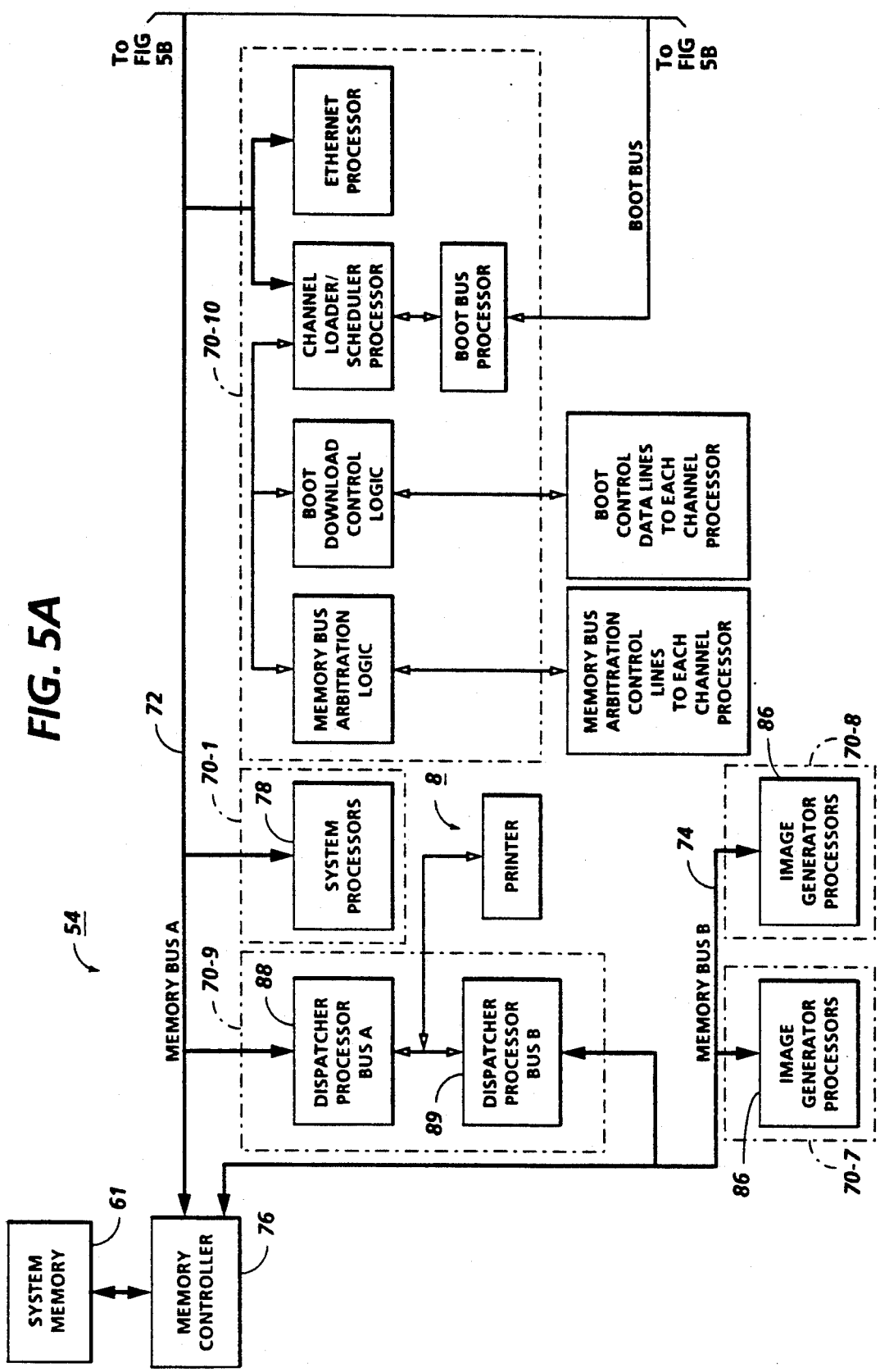

ELECTRONIC PRINTING SYSTEM FOR PRINTING SIGNATURES

A portion of the disclosure of this patent document contains material which is subject to Copyright protection. The Copyright owner has no objection to the facsimile reproduction by anyone of the patent document or the patent disclosure, as it appears in the Patent and Trademark Office patent file or records, but otherwise reserves all Copyright rights whatsoever.

The invention relates to electronic printers and printing systems, and more particularly, to an electronic printing system for printing signatures.

In the printing market place such as commercial print shops, signature printing remains largely a manual operation. The process by which signatures are printed involves placing images in a certain order on signature sheets so that when the signature sheets are folded and trimmed, books, booklets, magazines, etc. are produced with the book pages in the correct numerical order. However, to do this, the images must be placed manually, sheet by sheet, prior to printing. Further, all margins and the fold/cut lines that are to be used must be located and identified.

In placing the images on the signature sheet, attention must also be given to the problem of image loss due to obscuring of portions of the images by the bind. To prevent this, some of the images must be shifted or offset by incremental amounts, a process that is difficult to do manually. Further, the image shifting process is rendered even more complex and difficult by the fact that the incremental shift amounts change not only with the position of the sheets in the individual signature segments but also with the position of the signature segments in the book. Since in the usual commercial signature process, the sheets are first photographically etched onto plates, and the plates thereafter used by a printing press to print the signatures, any error or mistake that occurs during the signature preparation process can result in a substantial amount of delay, wasted effort, and expense.

In the prior art, U.S. Pat. No. 4,334,765 to Clark discloses an electrophotographic apparatus which has a booklet preparation capability in which documents can be presented to a feeder by an operator in one order and the feeder automatically and repeatedly presents the documents for production in another order, with the documents reduced and placed side by side in sequence to form a booklet. U.S. Pat. No. 4,538,905 to Griego et al discloses an electrophotographic printing machine which has electronic image registration to control image shift in accordance with paper position so that proper margins are maintained, while U.S. Pat. No. 4,727,402 to Smith discloses an automatic duplexing copier which automatically takes a serial set of documents and re-orders the documents into a predetermined non-serial order for signature pair "two-up" copying, with the finished signatures automatically center folded and finished. U.S. Pat. No. 4,731,637 to Acquaviva et al discloses an automatic "two-up" document registration and feeding system for a copier, while U.S. Pat. Nos. 4,745,441 and 4,819,029 to Maruta et al and Ito, respectively, disclose copy machines capable of forming filing margins on a copy. U.S. Pat. No. 4,789,147 to Berger et al discloses a system and method for selectively assembling and imaging books having a main control and a data processor with memory together with one or more bindery lines for gathering and assembling sections to form a book and imaging the book.

Further in the prior art, U.S. Pat. No. 4,789,879 to Murakami discloses a copier for composite copying having automatic magnification adjusting means in which magnification is corrected in response to a change in size of copy paper resulting from previous copying processes. U.S. Pat. No. 4,809,039 to Ishii discloses an electrostatic recording apparatus capable of setting an image at any desired position on a copy sheet by controlling shift data, while U.S. Pat. No. 4,814,822 to Acquaviva et al discloses a method and apparatus for automatic "two-up" copying which sequentially feeds and automatically reorders documents in signature page order. And U.S. Pat. No. 4,891,681 to Fiske et al discloses an apparatus for producing center fastened sheet sets wherein, during processing, the sides of the sheets are staggered by progressively cutting each successive sheet in the stack shorter than the sheet before it and aligning the stacked sheets in a trapezoidal shape prior to fastening the sheets together.

In contrast, the present invention provides a process for printing signatures or signature sets in an electronic printing system which produces prints of image pages from electronic pages composed of image signals, the system having a source of print media sheets for the prints including signature prints and programming means including a display screen for programming the system to produce prints including signature prints, comprising the steps of: electronically displaying print programming selections including signature print programming selections on the screen; programming signature print instructions by actuating selected ones of the signature print programming selections; providing electronic pages for printing the signatures; ordering the electronic pages to print at least two of the image pages in an ordered side by side relation on at least one side of the print media sheets with the side by side image pages on each signature print separated from one another along a signature foldline in response to programming the signature prints; and printing the ordered image pages on the print media sheets to provide the signature prints.

IN THE DRAWINGS

Figure 1:
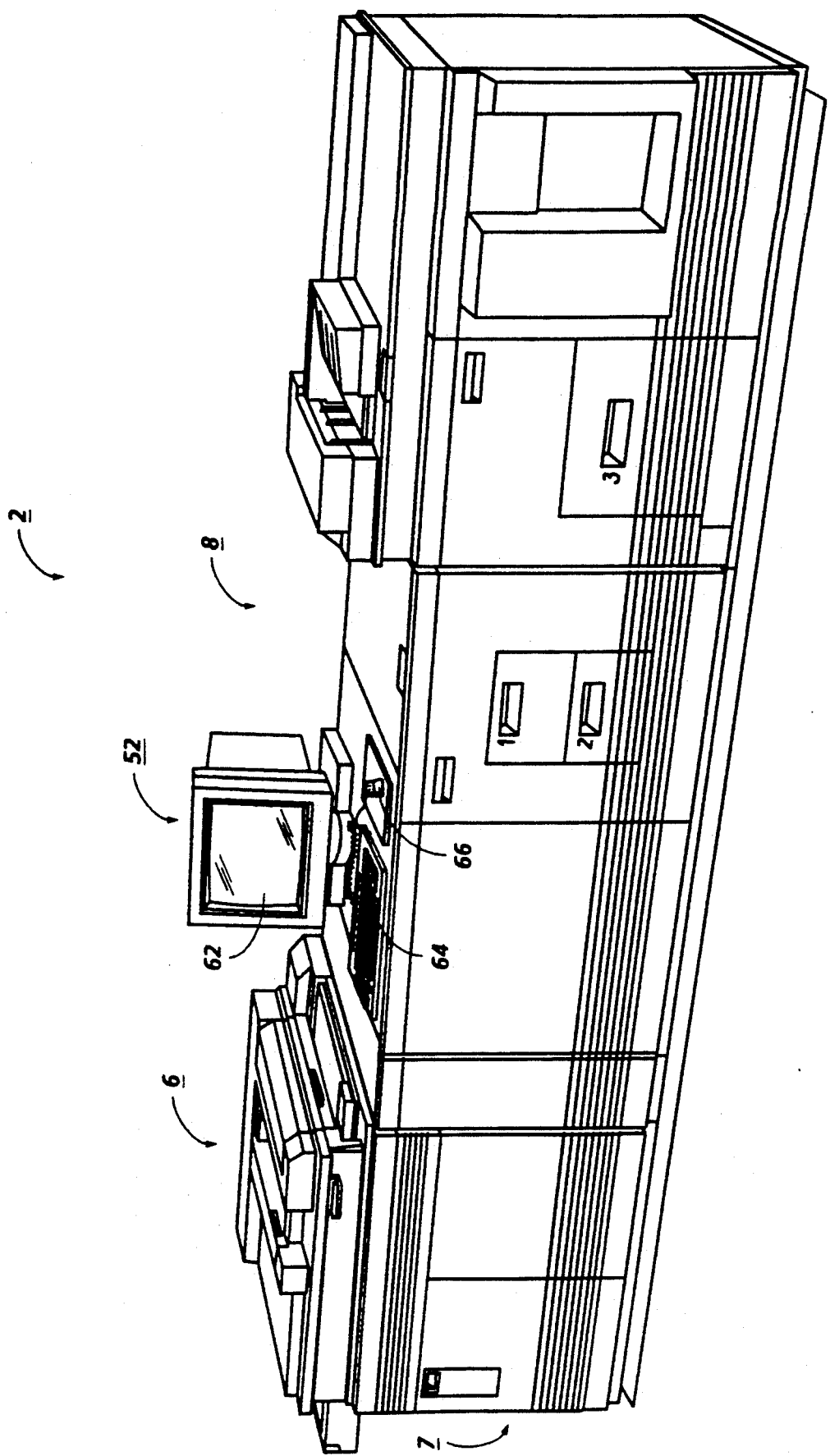
FIG. 1 is a view depicting the electronic printing system for printing signature of the present invention.
Figure 5B:
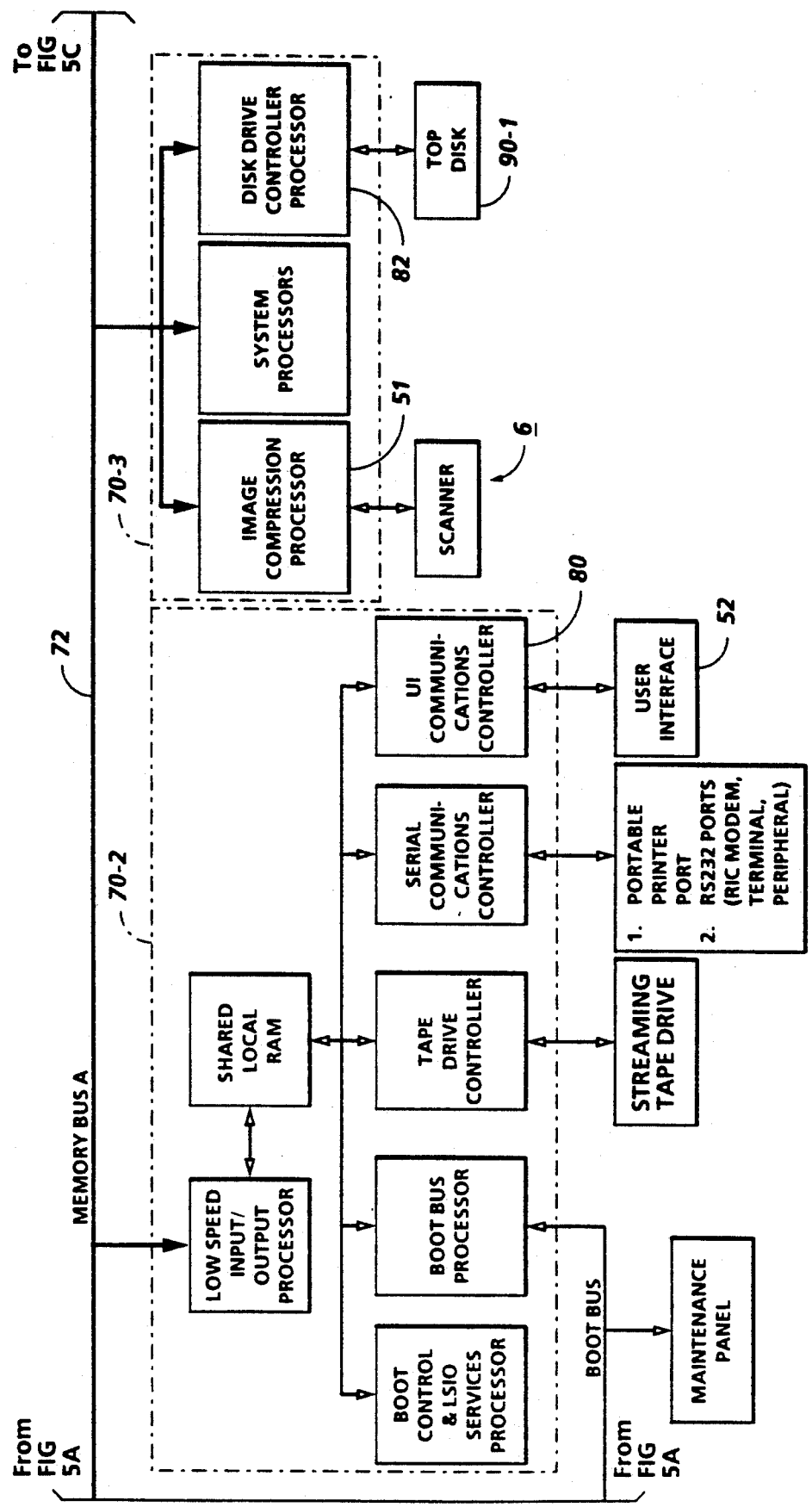
Figure 5C:
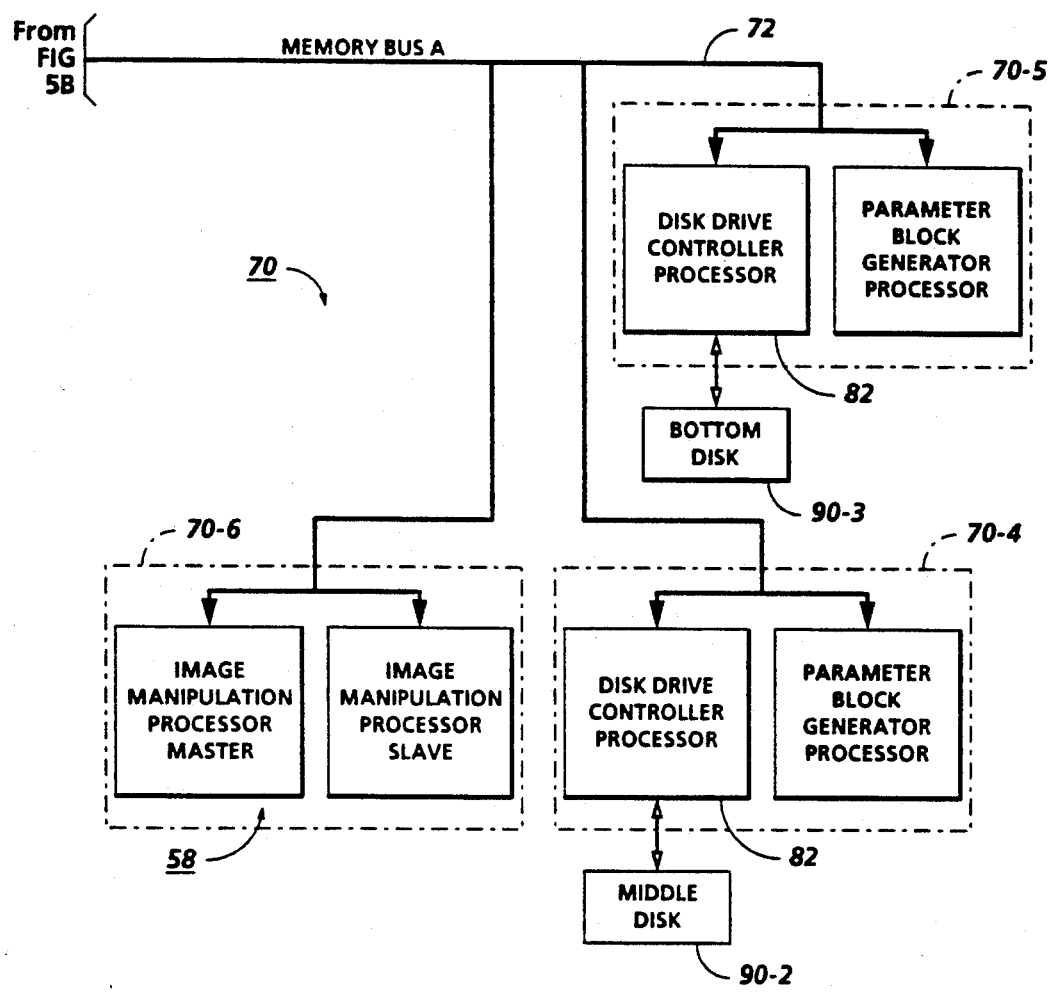
Figure 6:
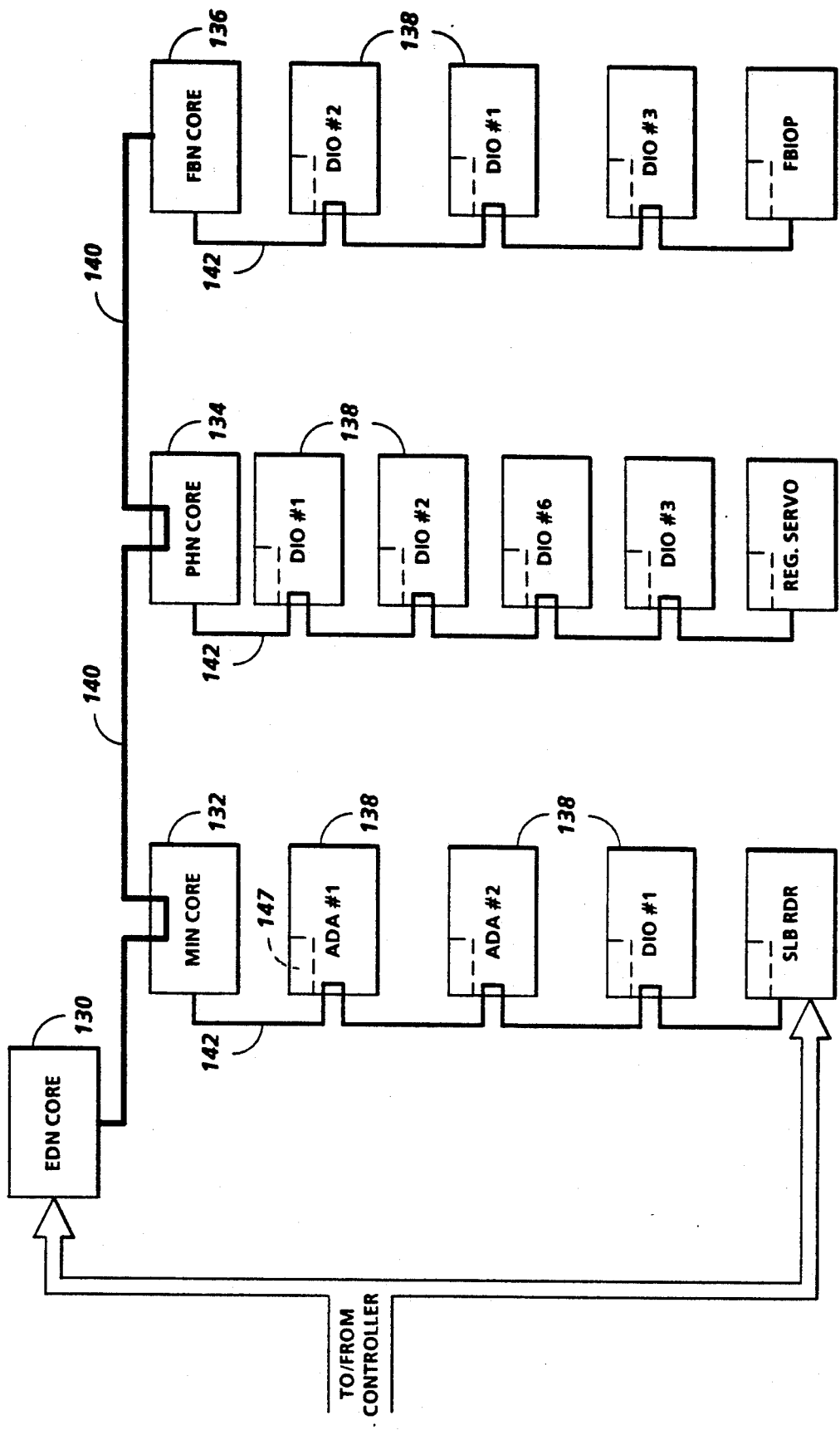
Figure 9:
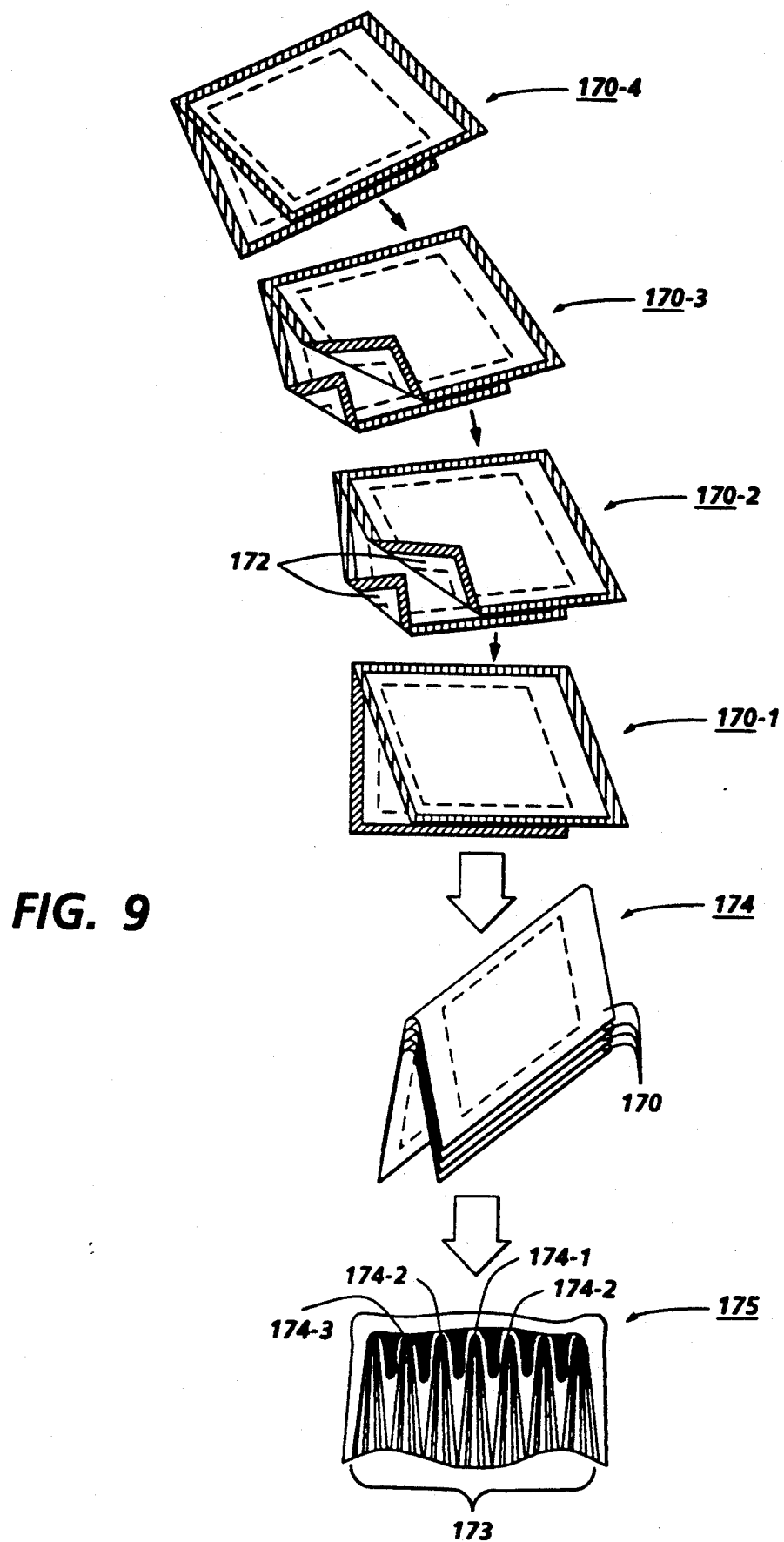
Figure 11:
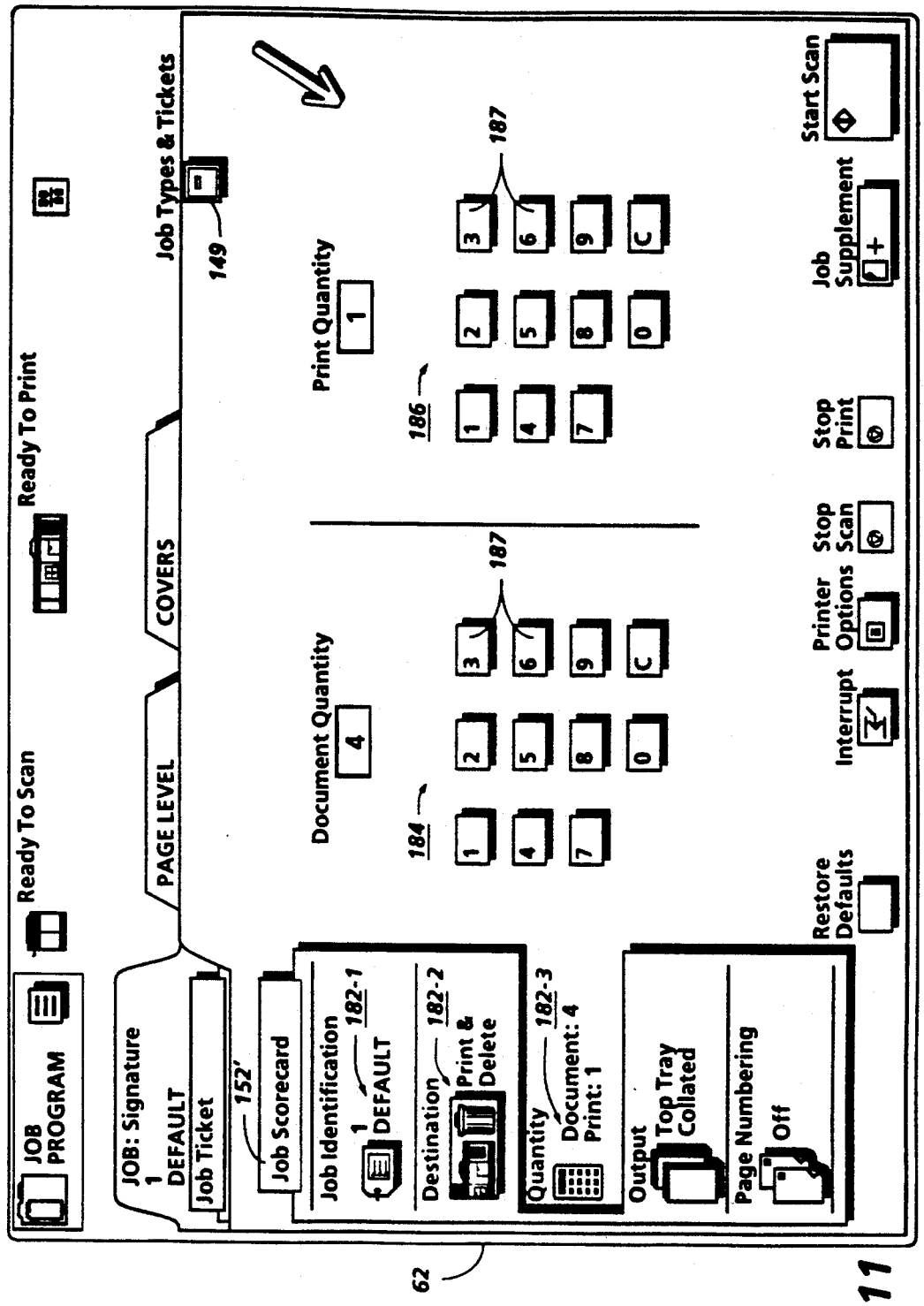
Figure 12:
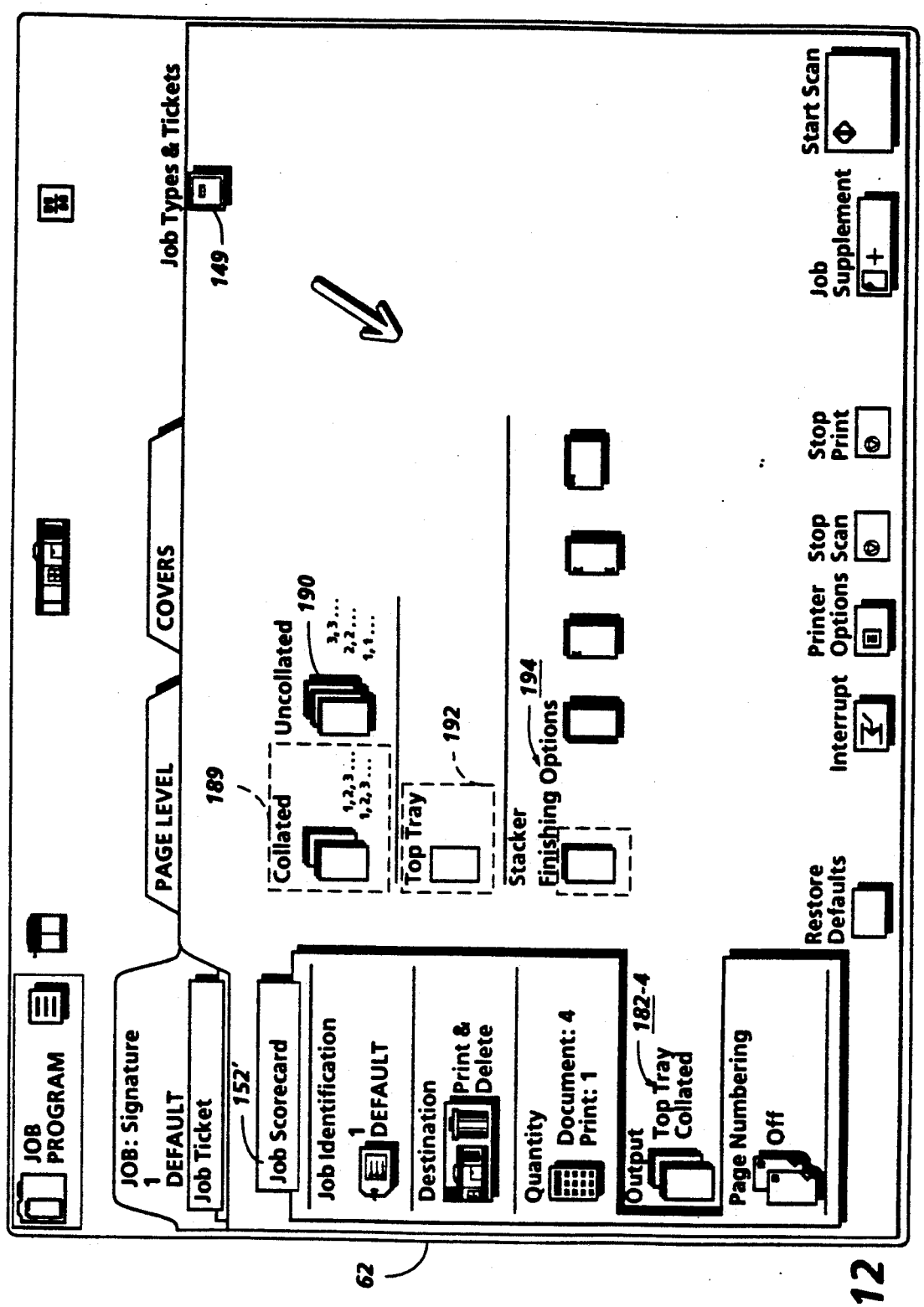
Figure 13:
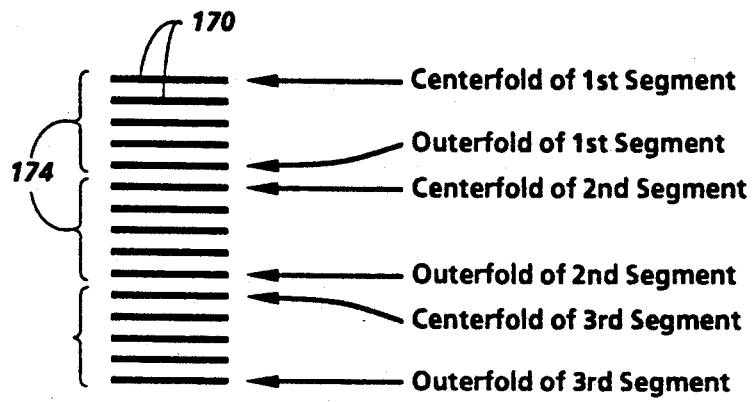
Figure 13:
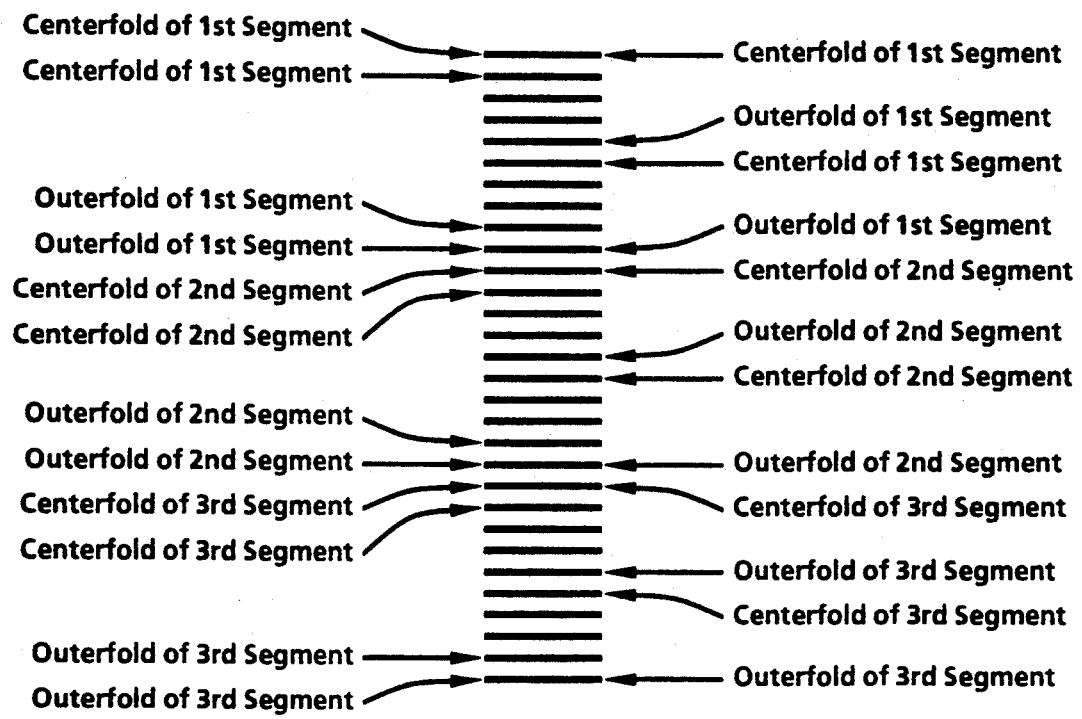
Figure 15:
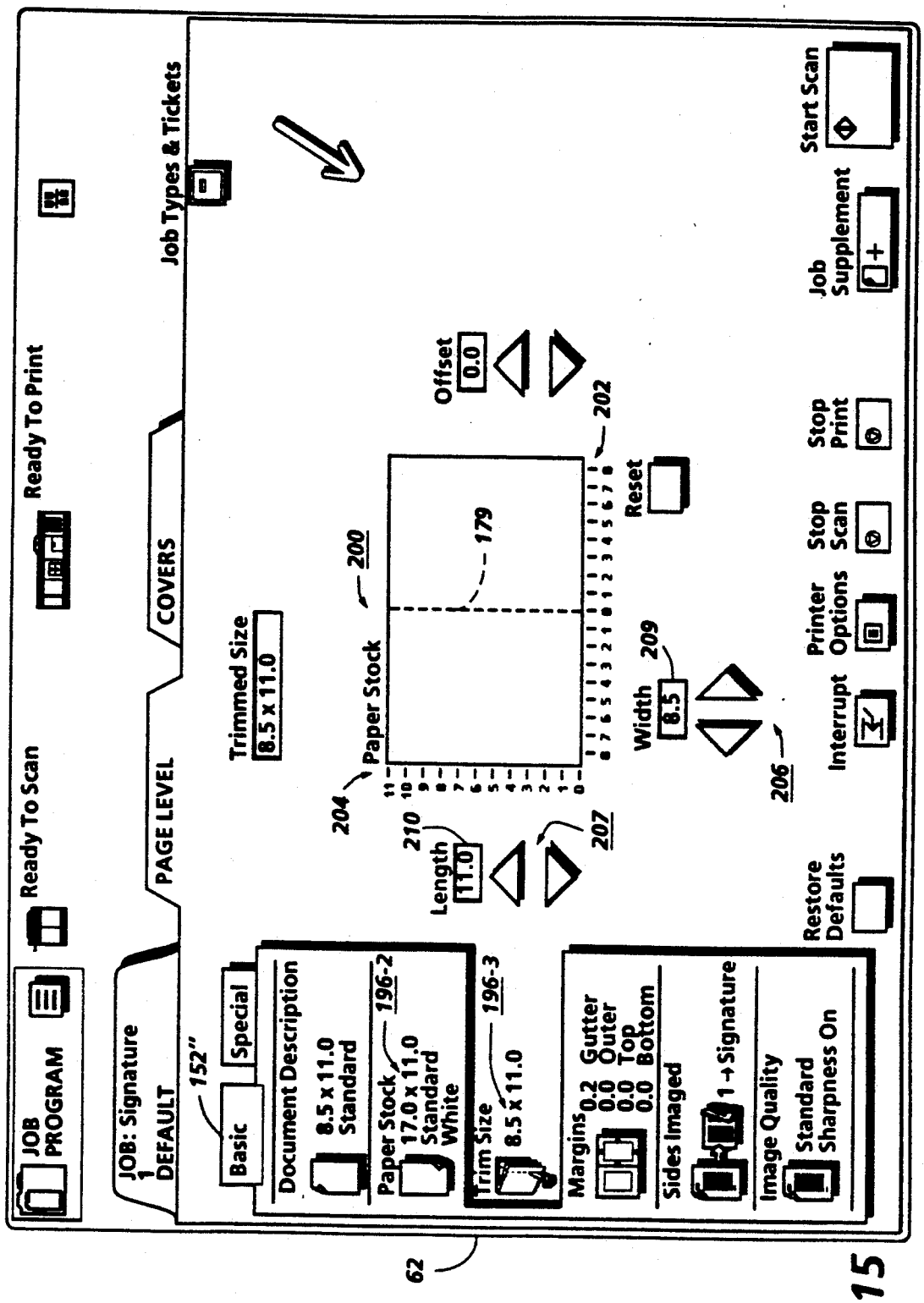
Figure 16:
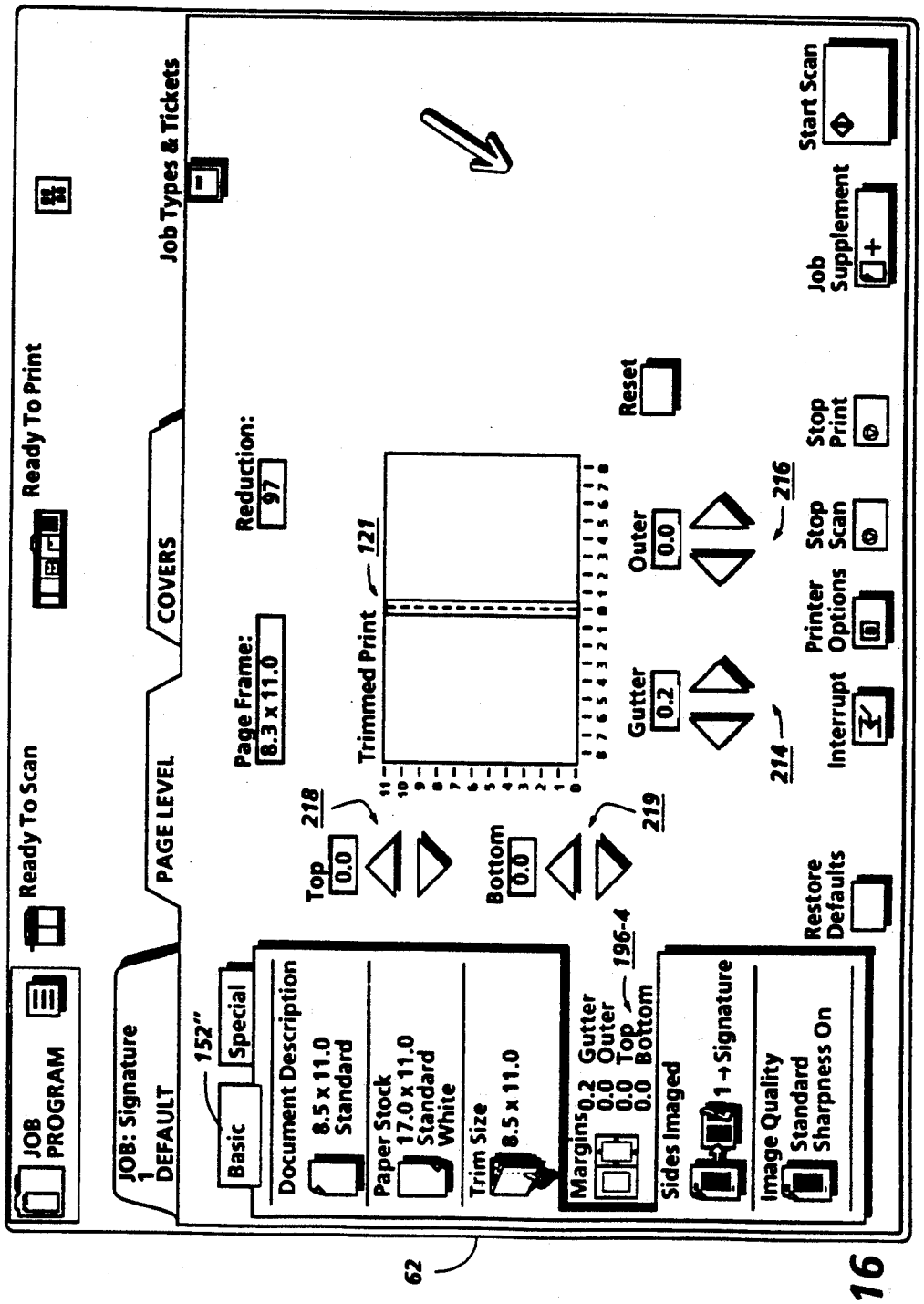
Figure 17:
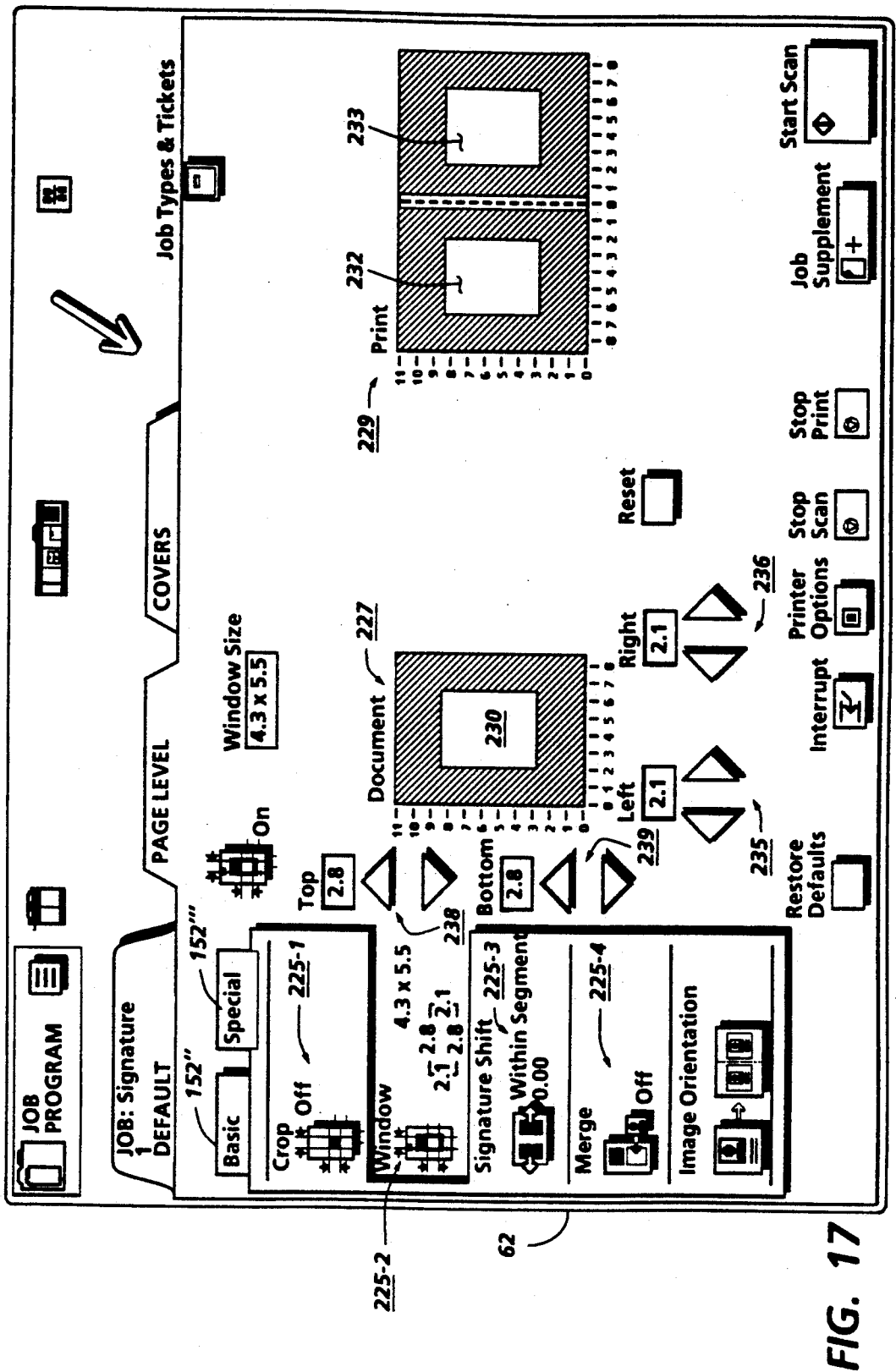
Figure 18:
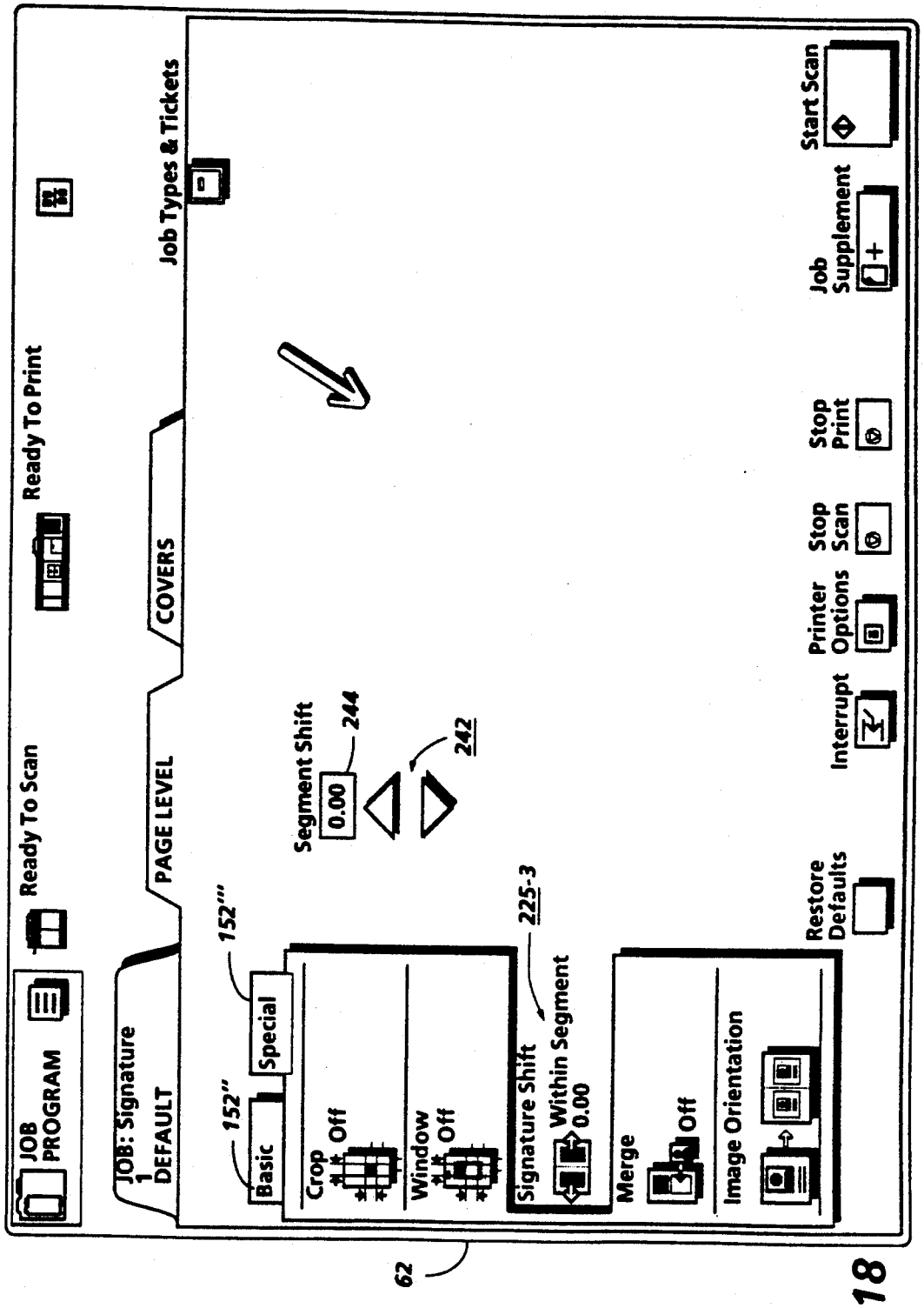
Figure 19:
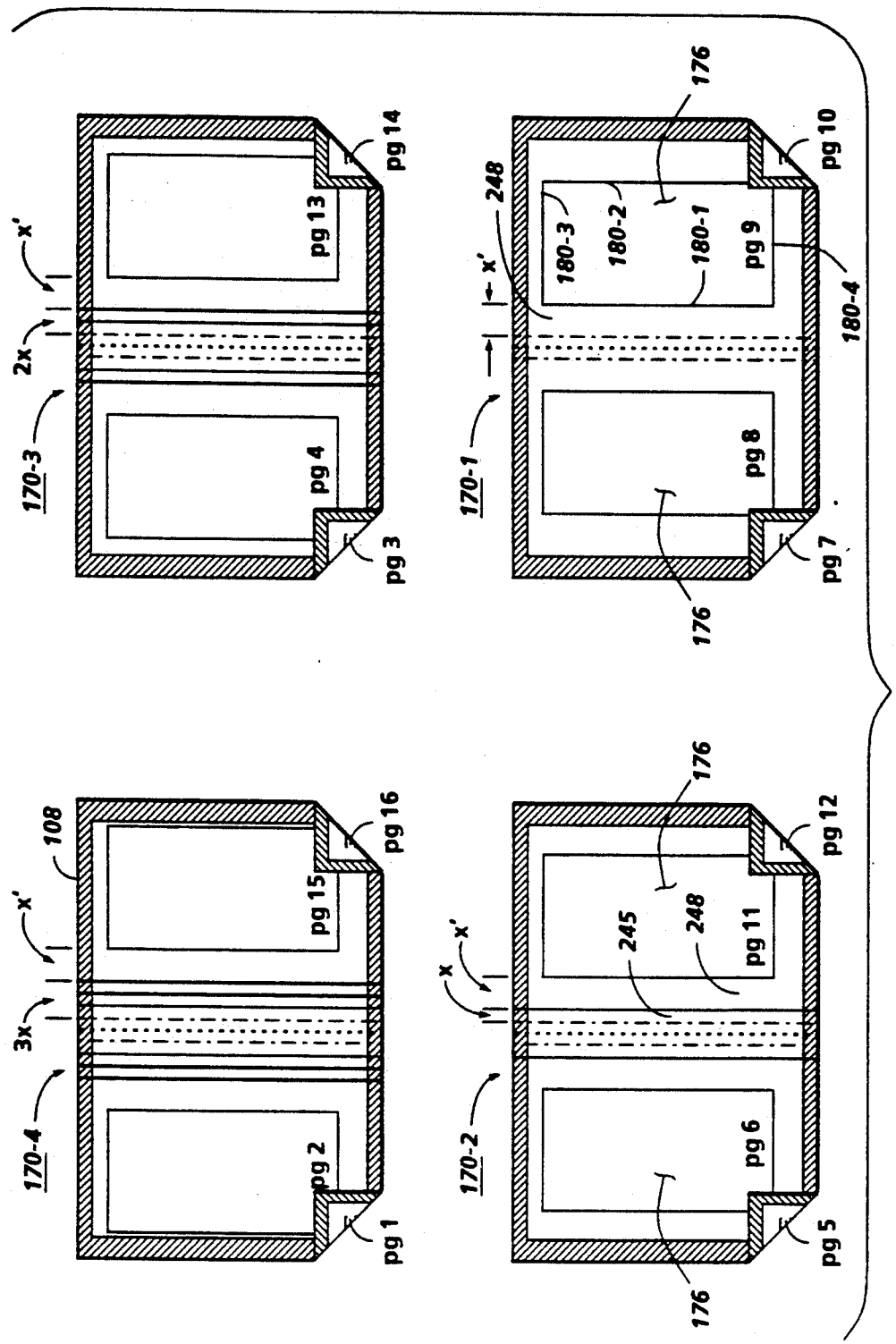
Figure 20:
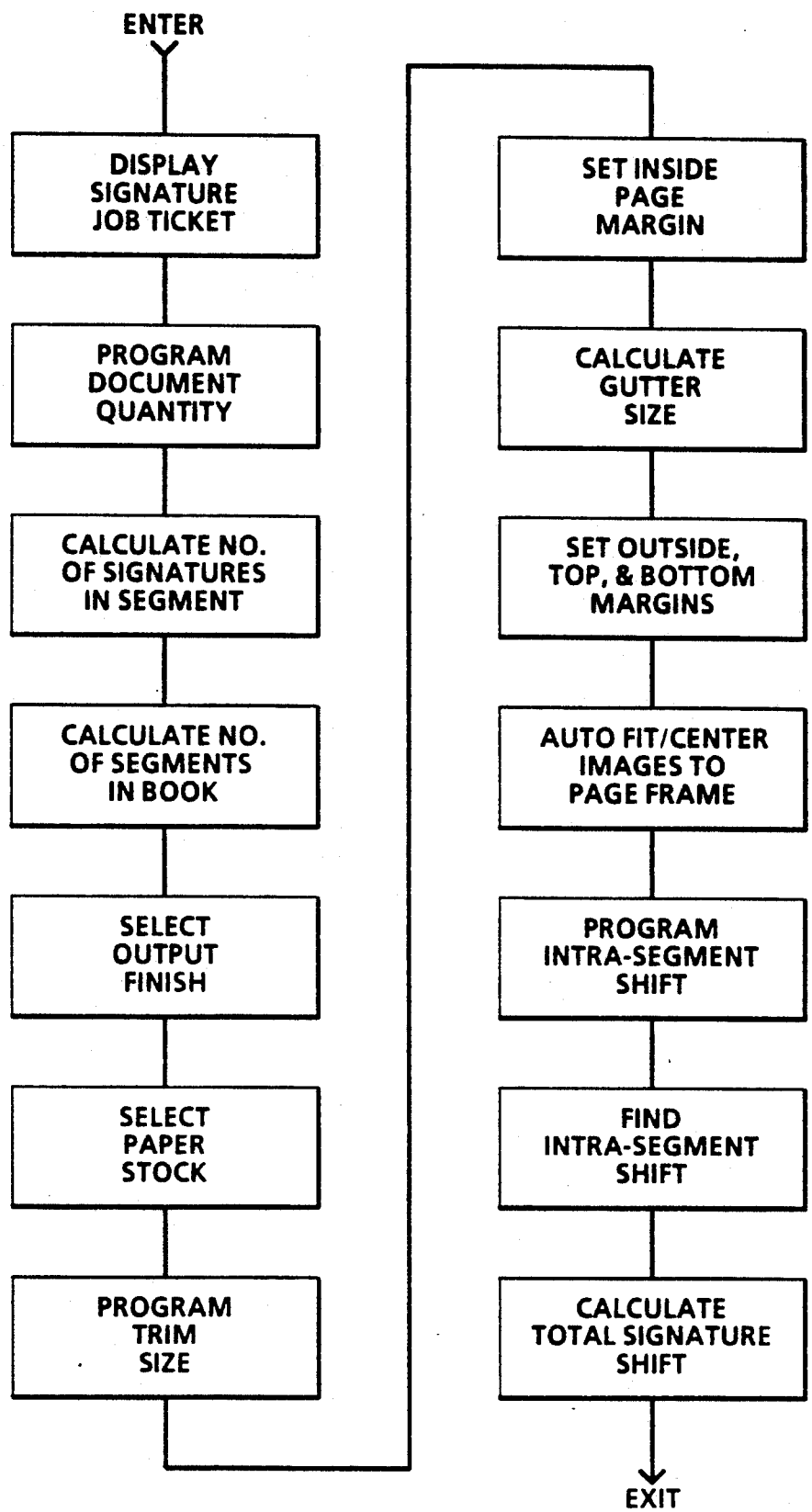

FIGS. 5A, 5B, and 5C comprise a schematic block diagram showing the major parts of the control section for the printing system shown in FIG. 1;

FIG. 6 is a block diagram of the Operating System, together with Printed Wiring Boards and shared line connections for the printing system shown in FIG. 1;

Figure 7:
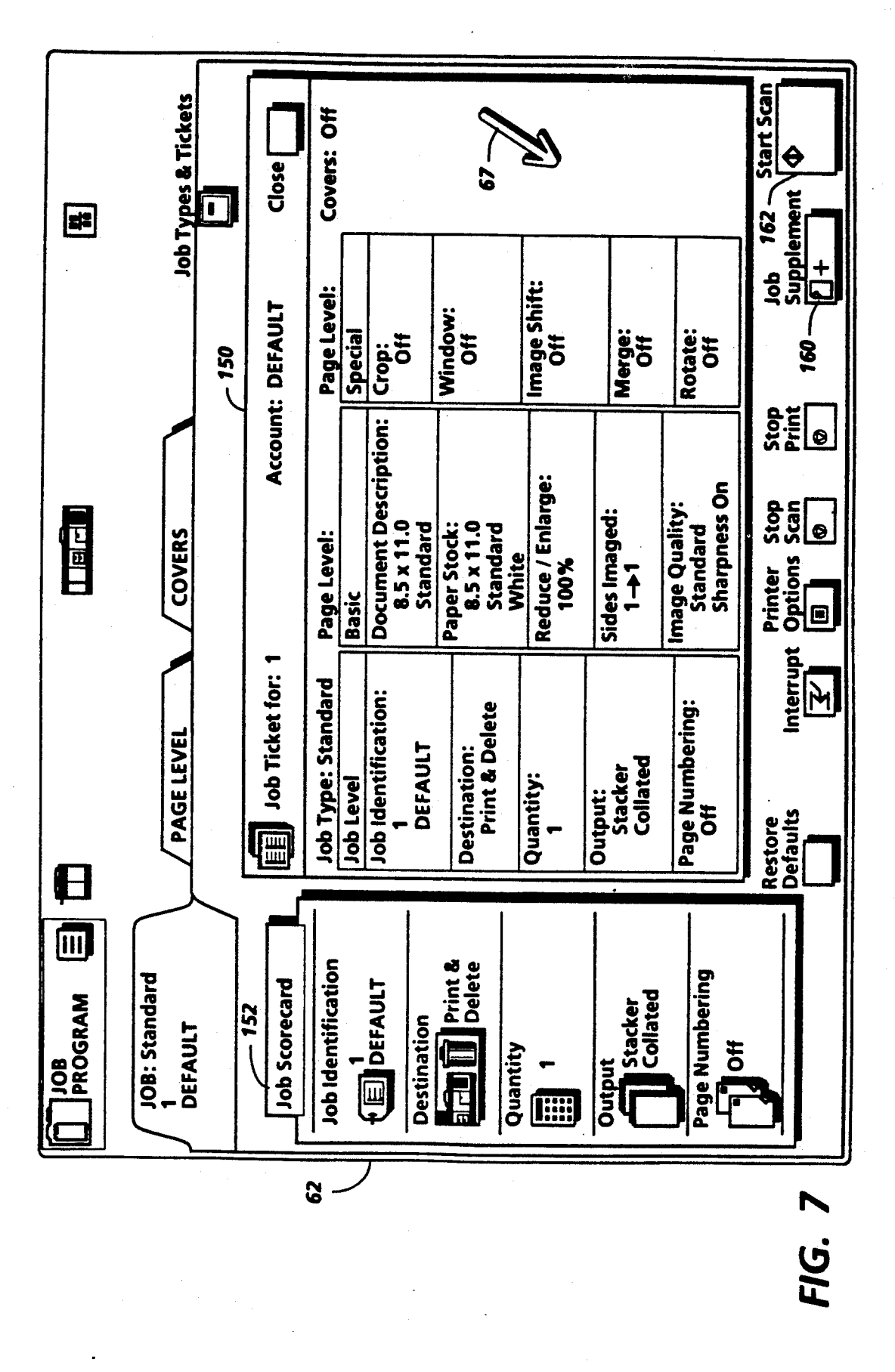

FIG. 7 is a view depicting the system User Interface (UI) touchscreen display showing an electronic Job Ticket and Job Scorecard of the type used to program print jobs on the printing system shown in FIG. 1;

FIGS. 8A-8D are views depicting the step by step readying of a signature job for printing;

FIG. 9 is an isometric view showing formation of a signature segment and book;

Figure 10:
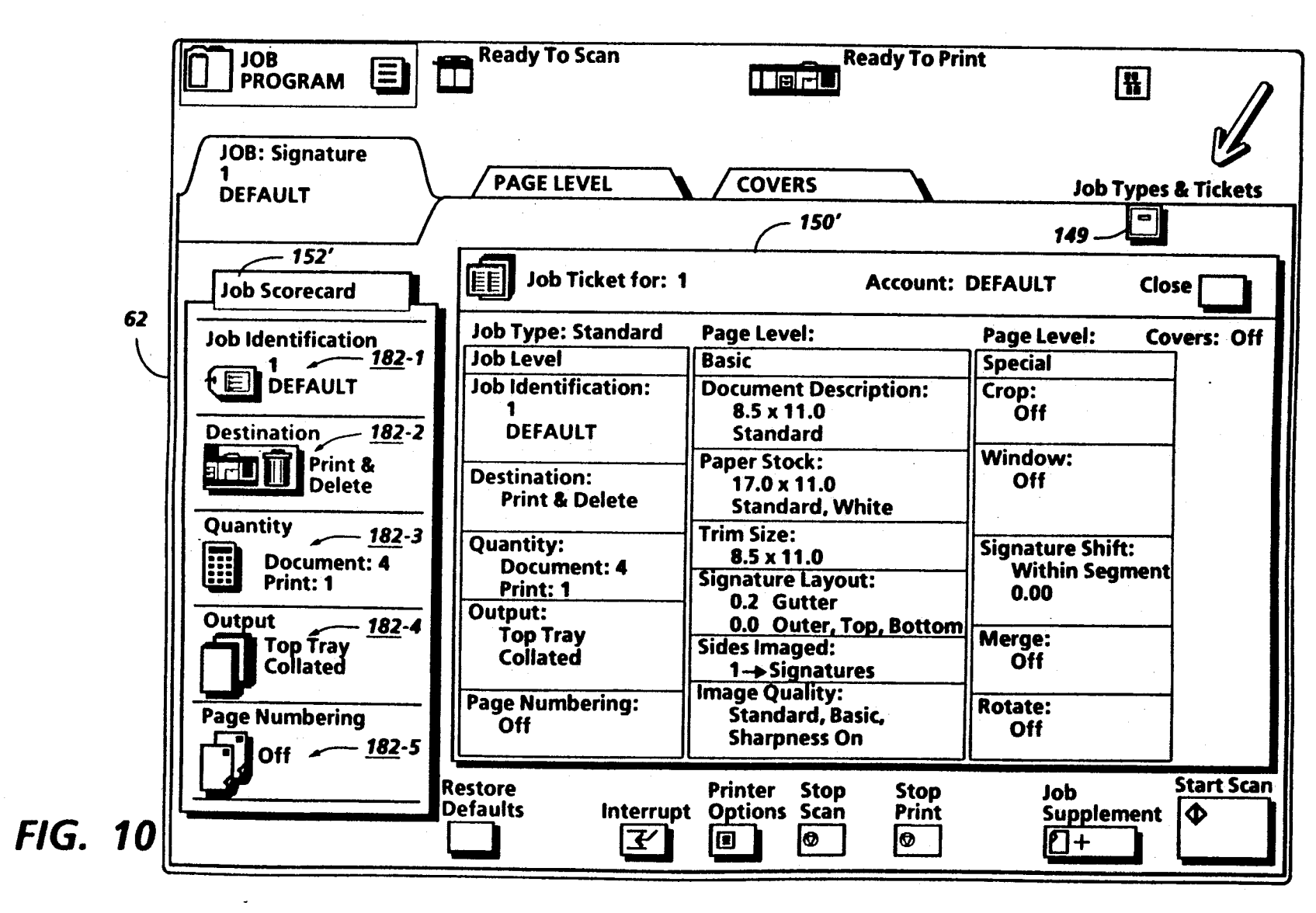

FIG. 10 is a view depicting a "Signature" Job Ticket and "Job Scorecard" for use in programming a signature job;

FIG. 11 is a view of the touchscreen display depicting program options for selecting signature quantity;

FIG. 12 is a view of the touchscreen display depicting program options for selecting signature output;

FIG. 13 is a view showing examples of possible signature output order selections;

Figure 14:
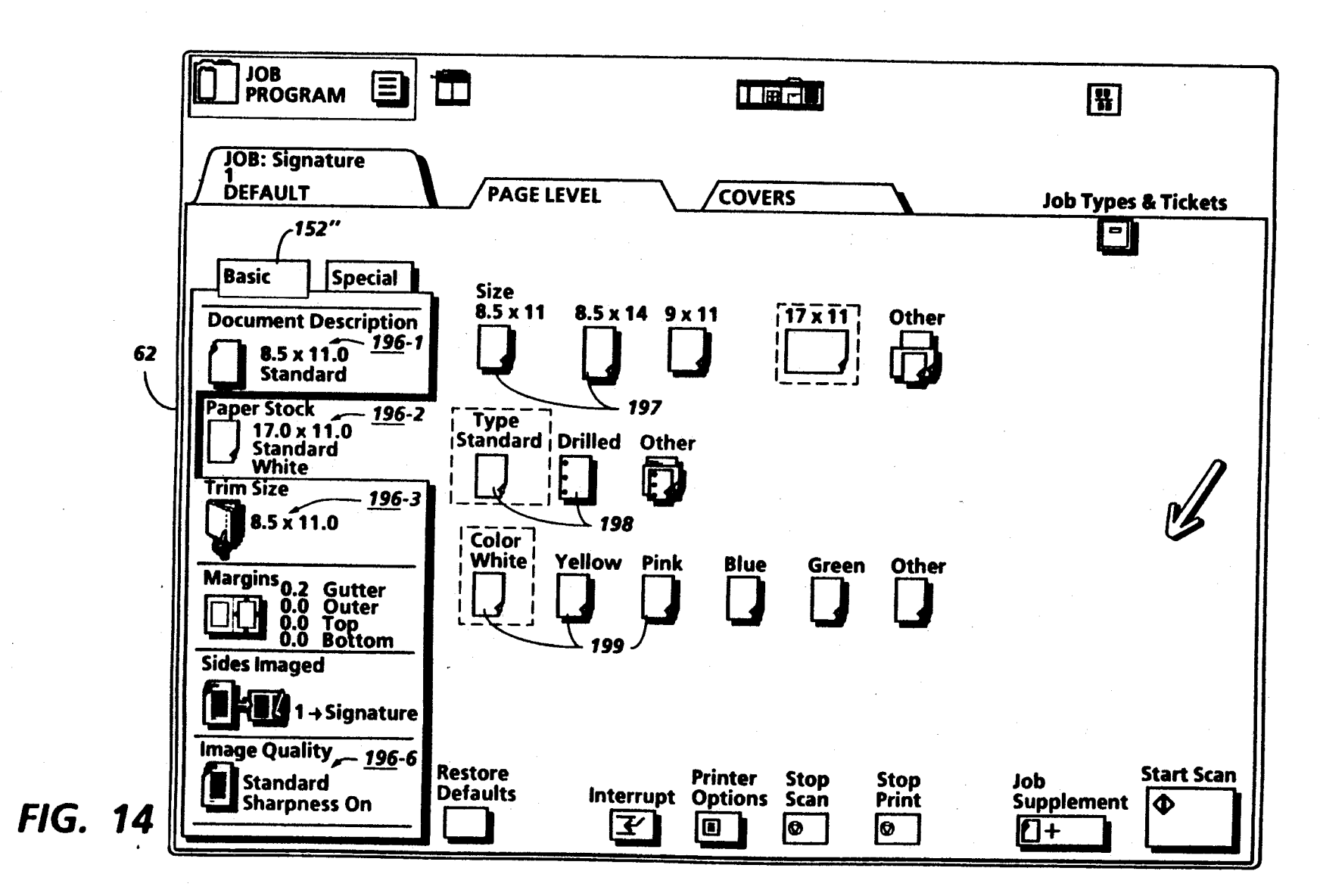

FIG. 14 is a view of the touchscreen display depicting program options for selecting signature Paper Stock;

FIG. 15 is a view of the touchscreen display depicting program options for selecting signature Trim size;

FIG. 16 is a view of the touchscreen display depicting program options for selecting signature length;

FIG. 17 is a view of the touchscreen display depicting program options for selecting signature image placement;

FIG. 18 is a view of the touchscreen display depicting program options for setting signature shift;

FIG. 19 is a view depicting step by step creation of a signature segment showing examples of both inter and intra segment shift; and FIG. 20 is a flow chart depicting the signature process.

Figure 2:
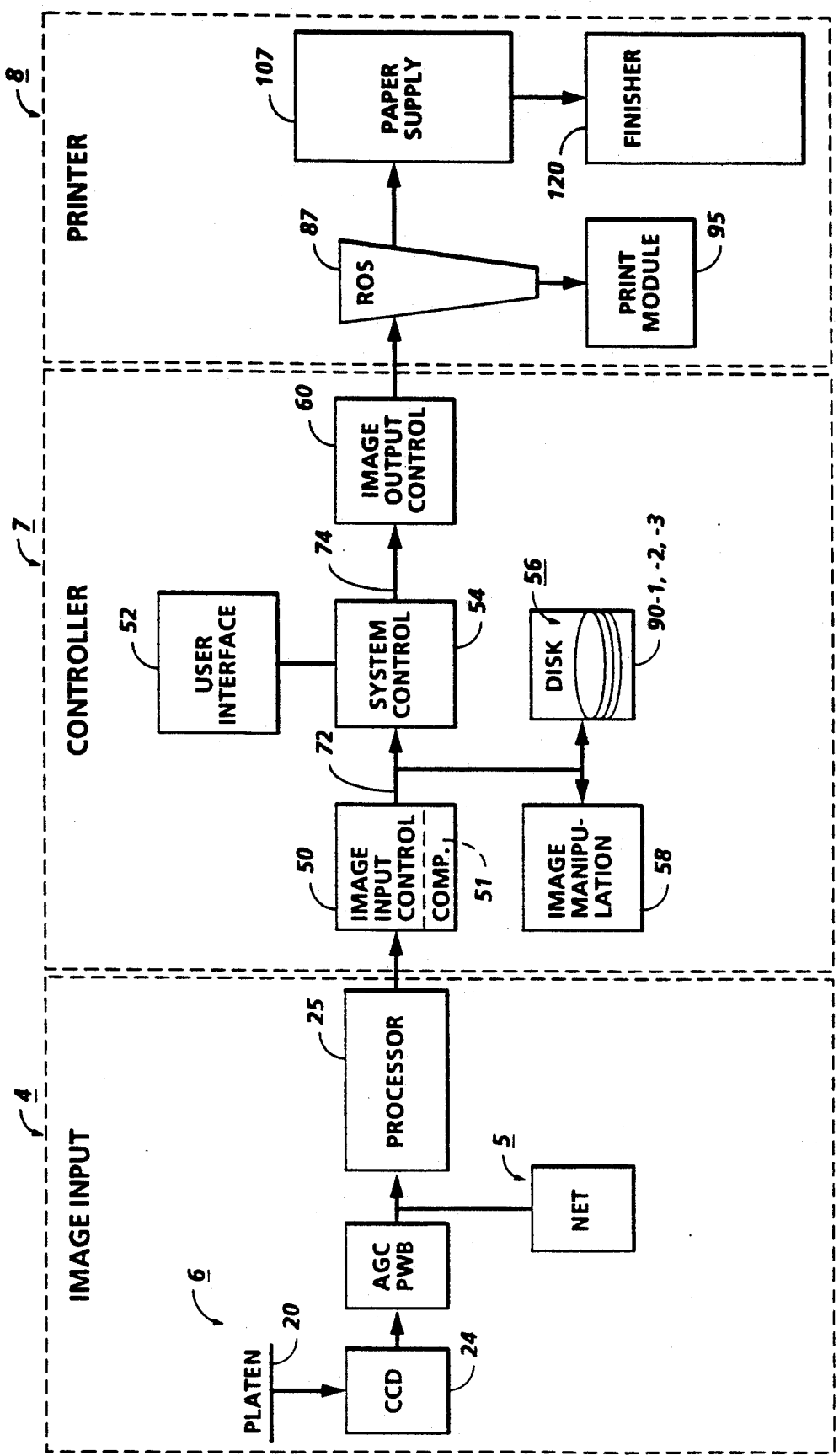
FIG. 2 is a block diagram depicting the major elements of the printing system shown in FIG. 1.

Referring to FIGS. 1 and 2, there is shown an exemplary image printing system 2 for processing print jobs including signature print jobs in accordance with the teachings of the present invention. Printing system 2 for purposes of explanation is divided into image input section 4, controller section 7, and printer section 8. In the example shown, image input section 4 has both remote and on-site image inputs, enabling system 2 to provide network, scan, and print services. Other system combinations may be envisioned such as a stand alone printing system with on-site image input (i.e., a scanner), controller, and printer; a network printing system with remote input, controller, and printer; etc. While a specific printing system is shown and described, the present invention may be used with other types of printing systems. For example, printer section 8 may instead use a different printer type such as ink jet, ionographic, etc.

Figure 3:
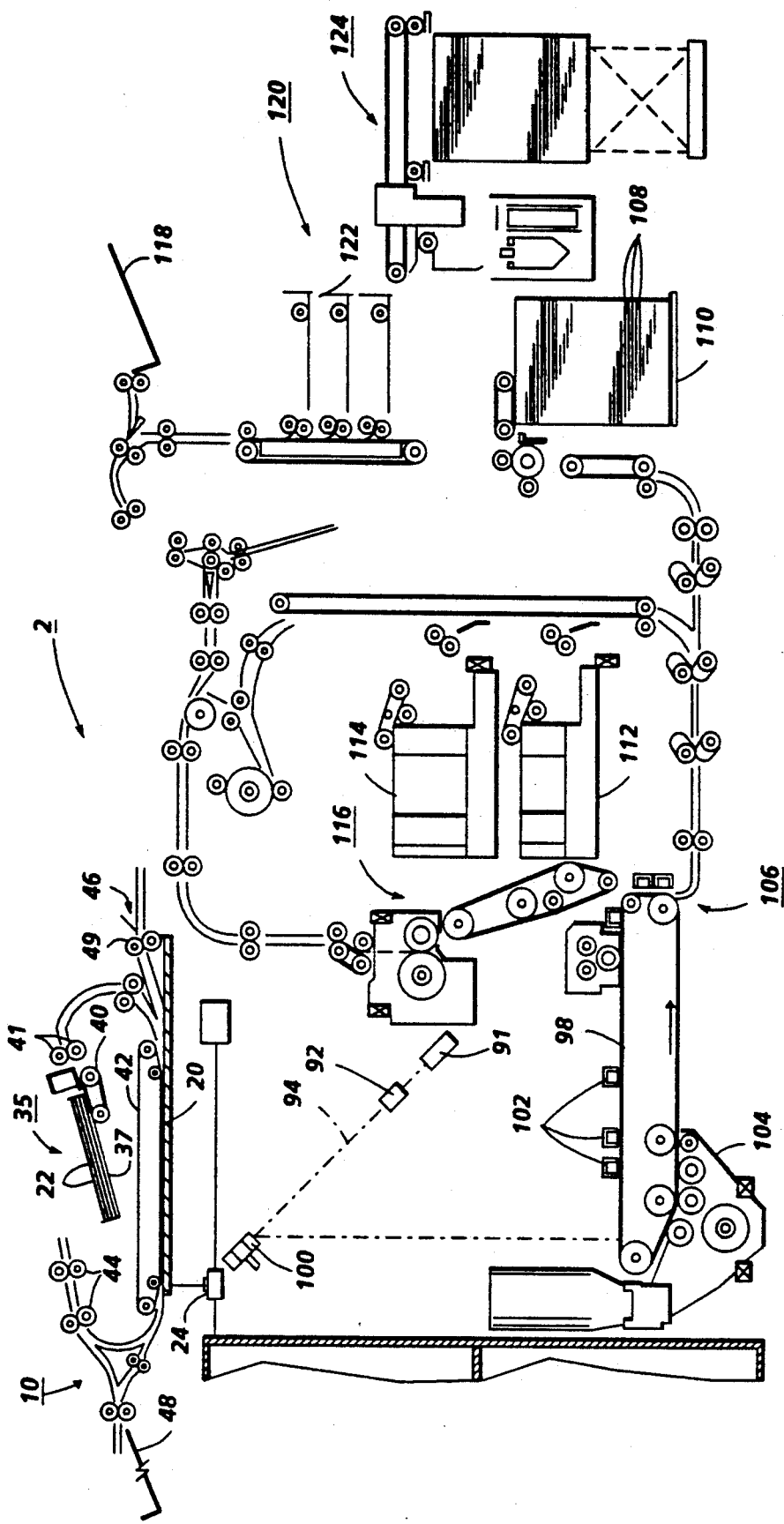
FIG. 3 is a plan view illustrating the principal mechanical components of the printing system shown in FIG. 1.
Figure 4:
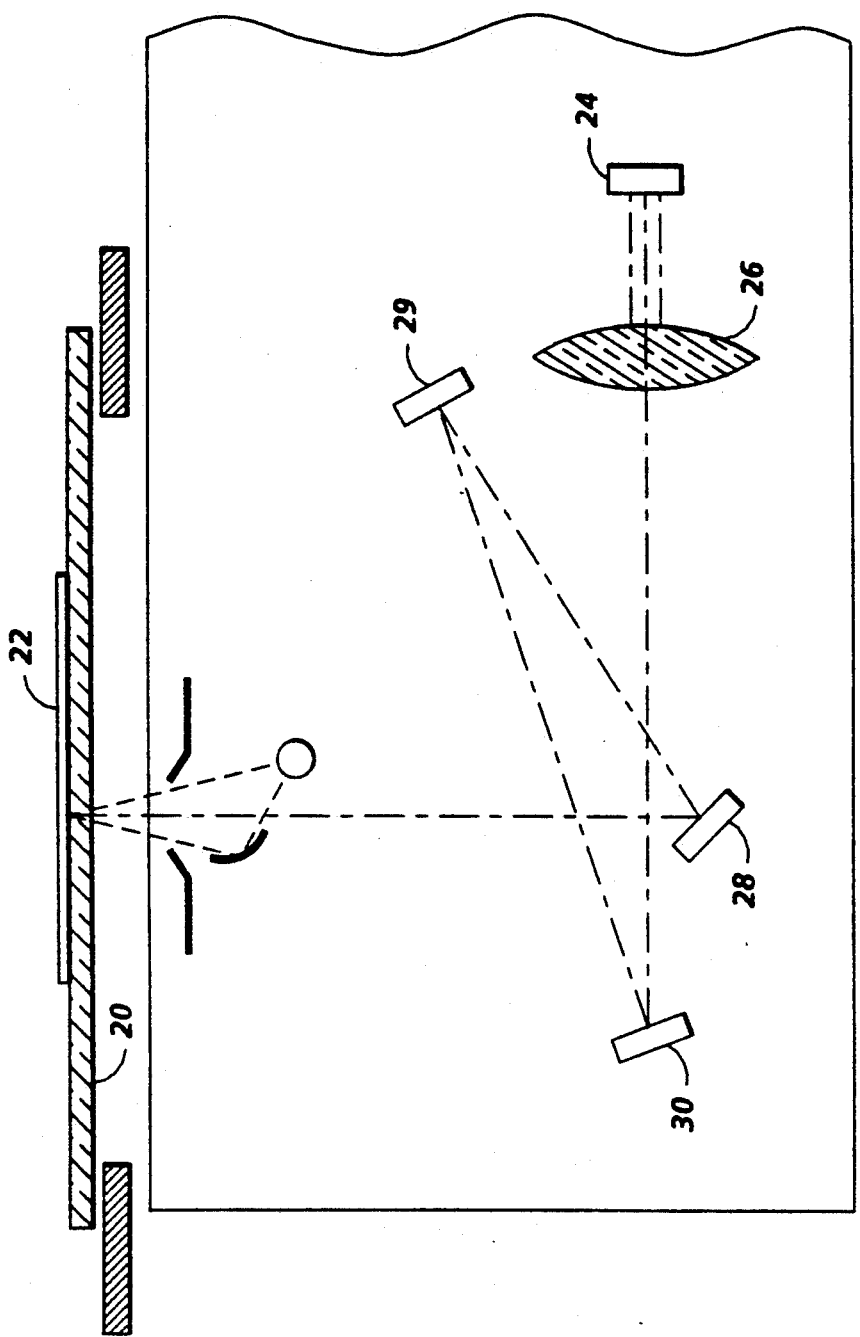
FIG. 4 is a schematic view showing certain construction details of the document scanner for the printing system shown in FIG. 1.

Referring particularly to FIGS. 2-4, for off-site image input, image input section 4 has a network 5 with a suitable communication channel such as a telephone line enabling image data in the form of image signals or pixels from one or more remote sources to be input to system 2 for processing. Where the Page Description Language (PDL) of the incoming imaging data is different than the PDL used by system 2, suitable conversion means (not shown) are provided. Other remote sources of image data such as streaming tape, floppy disk, etc. may be envisioned.

For on-site image input, section 4 has a document scanner 6 with a transparent platen 20 on which documents 22 to be scanned are located. One or more linear arrays 24 are supported for reciprocating scanning movement below platen 20. Lens 27 and mirrors 28, 29, 30 cooperate to focus array 24 on a line like segment of platen 20 and the document being scanned thereon. Image data in the form of image signals or pixels from net 5 or array 24 are input to processor 25 for processing. After processing, the image signals are output to controller section 7.

Processor 25 converts the analog image signals output by array 24 to digital. Processor 25 further processes image signals as required to enable system 2 to store and handle the image data in the form required to carry out the job programmed. Processor 25 also provides enhancements and changes to the image signals such as filtering, thresholding, screening, cropping, scaling, etc.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 from a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and for purposes of explanation is separated into a Raster Output Scanner (ROS) section 87, Print Module Section 95, Paper Supply section 107, and Finisher 120. ROS 95 has a laser 91, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108 as will appear may comprise any of a variety of sheet sizes, types, and colors. For transfer, the print media is brought forward in timed registration with the developed image on photoreceptor 98 from either a main paper tray 110 or from auxiliary paper trays 112 or 114. Print media 108 is fed with 11" dimension perpendicular to the direction of feed. Accordingly, variations in print media size are normally accommodated in the direction of sheet feed. For example, 8.5"×11" media is fed long edge first while 17"×11" media is feed short edge first. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Referring to FIGS. 1, 2 and 5, controller section 7 is, for explanation purposes, divided into an image input controller 50, User Interface (UI) 52, system controller 54, main memory 56, image manipulation section 58, and image output controller 60.

The scanned image data input from processor 25 of image input section 4 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc are carried out. Following processing, the data may be returned to main memory 56, sent to UI 52 for display on touchscreen 62, or sent to image output controller 60.

Image data output to image output controller 60 is decompressed and readied for printing by image generating processors 86 of PWBs 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Referring particularly to FIGS. 5A-5C, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having plural system processors 78; low speed I/O processor PWB 70-1 having UI communication controller 80 for transmitting data to and from UI 52; PWBs 70-3, 70-4, 70-5 having disk drive controller/processors 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Referring particularly to FIG. 6, system control signals are distributed via a plurality of printed wiring boards (PWBs). These include EDN core PWB 130, Marking Imaging core PWB 132, Paper Handling core PWB 134, and Finisher Binder core PWB 136 together with various Input/Output (I/O) PWBs 138. A system bus 140 couples the core PWBs 130, 132, 134, 136 with each other and with controller section 7 while local buses 142 serve to couple the I/O PWBs 138 with each other and with their associated core PWB.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVW memory types are resident at various locations within system 2.

Referring to FIG. 7, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job.

Figure 8B:
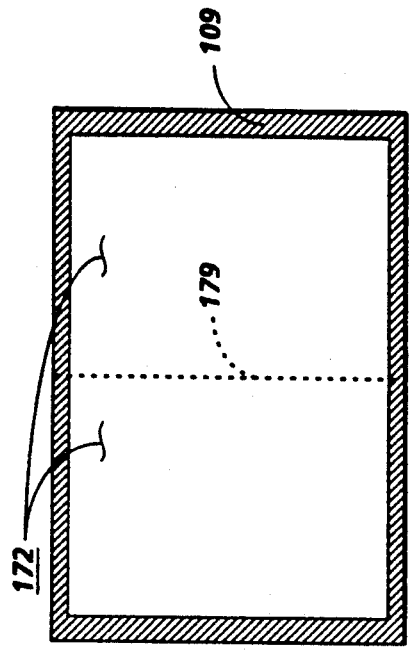
Figure 8D:
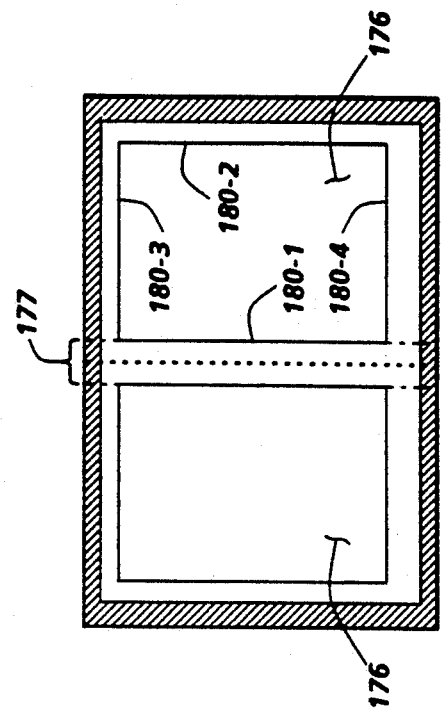
Figure 8A:
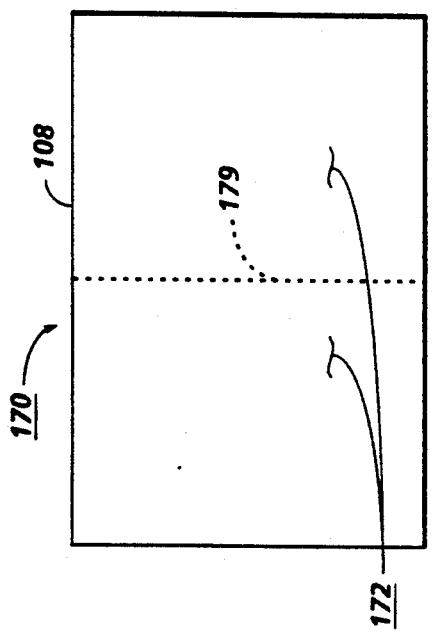

Referring to FIGS. 8A, 8B and 9, as used herein, a signature 170 is one sheet of print media 108 having P pages 172, ½P pages on each side, (some of which may be blank in order to fill in the signature as will appear). A segment 174 is two or more signatures 170 assembled and folded at the centerline 179. A book 175 consists of two or more segments 174, each usually having the same number of signatures 170, assembled together. A set 173 is one copy of the finished product or signature document which can be a signature 170, a segment 174 or a book 175 (i.e., a brochure, newsletter, textbook, etc.).

As shown in FIG. 19, the signature imposition process of system 2 arranges the images so that the first and last pages printed are on the back side of the outermost signature 170-4 with the second and next to the last pages printed on the front side of the signature, the third and second from last pages printed on the back side of the next to the last signature 170-3 with the fourth and third from the last pages printed on the front side of signature 170-3, etc. In the examples shown in FIG. 9, 4 signatures 170 are folded and nested to provide a segment 174, with several segments combined to form a book 175.

The number N of pages 172 in a set 173 together with the number P of pages 172 per signature 170 are used by the system to determine the number of signatures 170 in the set 173, as per the following relation:

$$Sl = (N + P - 1)/P$$

where
SI is the number of signatures in the set,
N is the number of pages in the set, and
P is the number of pages per signature.

Where N MOD P is not zero (0), blank pages B are required to be added to the end of the set to fill in the partial signatures as per the following:

$$B = P - N \text{ MOD } P \text{ (if } N \text{ MOD } P \neq 0)$$

$$B = 0 \text{ (if } N \text{ MOD } P = 0),$$

where
B is the number of blanks to be added to the end of the signature set.

For example, if a signature set has 5 pages (N=5) and there are 4 pages per signature (P=4), then the number of blank pages that need to be added are 3 (B=3).

These calculations are based on the number of signatures and segments that can be reliably bound together, the type and thickness of the copy sheets 108 used, etc.

Figure 8C:
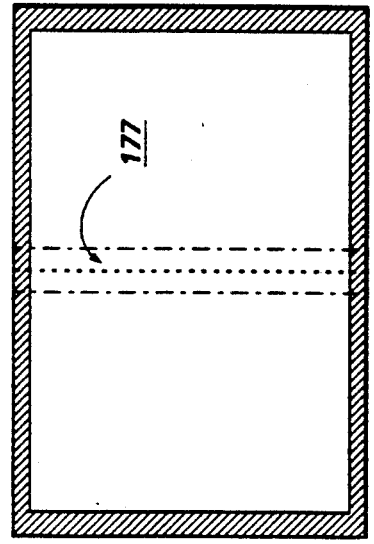

Referring also to FIGS. 8C and 8D, the area between the pages 172 of each signature 170 is referred to as the gutter 177. Signature foldline 179 is centered in gutter 177. The size, i.e. the width, of gutter 177 is determined by the inside margins 180-1 of the page frame 176 on each side of foldline 179. Inside, outside, top, and bottom margins 180-1, 180-2, 180-3, and 180-4, which define a page frame 176, are used to determine the minimum gutter size necessary to prevent parts of the signature images from becoming obscured when the signatures 170 or segments 174 are assembled together.

Referring to FIGS. 10 and 20, to program printing system 2 for a signature print job, the operator, using "Job types & Tickets" icon 149, accesses and displays a signature job ticket 150'. Signature Job ticket 150' has a series of default programming selections arranged in three columns or rows labeled "Job Level", "Basic", and "Special". A job scorecard 152', which can be displayed alongside job ticket 150', is provided for each of the "Job Level", "Basic" and "Special" selections. By using the scorecard, the operator can re-program the default selections. In the example shown in FIG. 10, the "Job Scorecard" for "Job Level" programming is displayed. Scorecard 152 has programming icons 182-1, 182-2, ... 182-5 corresponding to the selections in the "Job Level" column on signature job ticket 150'.

Referring to FIG. 11, where for example it is desired to change the default setting for "Quantity", icon 182-3 on "Job Scorecard" 152' is actuated to display "Document Quantity" and "Print Quantity" keyboards 184, 186 respectively. Keys 187 of keyboard 184 are used to select the number of pages P (FIG. 8B) 172 in one set while keys 187 of keyboard 186 are used to input the number of sets to print, each set being identical. As explained, a set or completed signature document can consist of a signature 170 (i.e., a brochure), a segment 174 (i.e., a newsletter) or a book 175 (i.e., a textbook). In the last case, keys 187 of keyboard 186 indicate the number of copies of book 175 to print.

A similar keyboard display (not shown) is used to enter the number of segments 174 for a single book 175. The default setting for the number of segments 174 in a book 175 is 1 unless otherwise changed.

As described, the print media is fed with the 11" dimension perpendicular to the direction of feed. As a result, different size print media (such as 11×17 and 8.5×11) can have different feed orientations. Where signatures are printed on 11"×17" print media, the print media is split in two along the vertical foldline to provide two 8.5""×11" pages. Where 8.5"×11" print media is used, the page frames are rotated 90° with the print media split in two along the horizontal foldline to provide two 8.5"×5.5" page frames.

Referring to FIG. 12, in the default setting, signatures are output to top tray 118 (shown in FIG. 3) and collated. Where the operator wishes to change the default setting, the output icon 182-4 on scorecard 152' is actuated to display collated-uncollated selection icons 189, 190 and top tray-stacker selection icons 192, 194 respectively. By selective use of icons 190 and 194, the signature output may be changed from the default setting.

Referring also to FIG. 13, signatures 170 may be output as Single Copy, N Copies Uncollated, or N Copies Collated. In Single Copy, the last segment 174 (i.e., the third signature in the example shown) is on the bottom and the first segment is on the top. The signatures 170 within each segment are ordered, with the outermost or outerfold signature on the bottom of the segment and the centerfold signature on the top of the segment.

For N Copies Uncollated, the last segment 174 (i.e., the third segment in the example shown) is on the bottom and the first segment is on the top. The signatures within each segment are ordered with N copies of the outermost outerfold signature on the bottom of the segment and with N copies of the centerfold signature on the top of the segment.

For N copies Collated, N copies of the last segment 174 (i.e., the third segment in the example shown) are on the bottom and N copies of the first segment 174 are on the top. The signatures within each segment are ordered, with the outerfold signature on the bottom of each segment and the centerfold signature on the top of the segment.

In the example shown in FIG. 13, N=2.

While N-1 output is described, 1-N output may instead be contemplated.

Other default settings at the "Job Level", may be similarly changed.

Where the operator desires to change the default setting and program different selections in the "Basic" and "Special" options, job scorecards for these selections are accessed in the manner described.

Referring to FIG. 14, where for example a different size, type, or color print media is desired, "Basic" scorecard 152" is actuated and displayed on touchscreen 62. "Basic" scorecard 152" has a series of icons 196-1, 196-2, ... 196-6 corresponding to the "Basic" signature programming selections displayed on job ticket 150' including a Paper Stock icon 196-2. Actuation of Paper Stock icon 196-2 displays the various size, type, and color print media selections available in the form of icons 197, 198, 199 respectively. Using icons 197, 198, 199, the size, type, and/or color print media for the signature job may be changed. When selection is completed, Paper Stock icon 196-2 is closed.

Referring now to FIGS. 8B and 15, where the overall size of the signature pages 172 are to be smaller than the print media on which signatures 170 are printed, "Trim Size" icon 196-3 is accessed to display on screen 62 an electronic sheet 200 representing the print media on which the signatures will be printed. There is also displayed signature foldline 179 and numbered scales 202, 204 along the bottom and side of the sheet 200. Width and height scrolling icons 206, 207 are displayed to enable the trim of the width and height of the sheet 200 displayed on touchscreen 62 to be changed. Windows 209, 210 display the current width and height selections in inches. When programming is completed, Trim Size icon 196-3 is closed.

Once set, the trim size of the print media becomes the physical output constraint since media 109 outside the trim border is cut off by a suitable trimmer (not shown) when the signatures 170 reach the finishing stage. If trim size is not changed, the default setting in which trim size is equal to the output signature size is programmed.

Referring to FIGS. 8C, 8D and 16, following setting of the trim size, where it is desired to change the signature layout (namely gutter size and side, top, and bottom margins of the image frame 176), "Signature Layout" icon 196-4 on scorecard 152' is actuated. This displays an electronic print 121 labeled "Trimmed Print" and gutter scrolling icon 214 on screen 62. Using icon 214, the inside margins 180-1 are set. As shown, margins 180-1, which are applied to each side of foldline 179, determine the width of gutter 177.

The outside, top, and bottom margins 180-2, 180-3, 180-4 of the page frame may also be set using outer, top, and bottom margin scrolling icons 216, 218, and/or 219 respectively.

As described, the margins 180 of the page frame 176 may be established by programming the margins for the final signature page frame when the job is prepared for scanning. The programmed margins are then applied to the image printed on the output page. Alternately, the operator can specify the margins desired and place the image within the specified margins. This latter method allows the operator to make any additional adjustments to the margins which might be desired as described above.

Referring to FIG. 17, to do this, "Window" on signature Job Ticket 150' (FIG. 10) is actuated to display "Special" scorecard 152" having selection icons 225-1, 225-2, 225-3, 225-4, and 225-5 corresponding to the selections on the Job Ticket. Window icon 225-2 is opened, displaying electronic document and print 227, 229 respectively. Document 227 has an image 230 representing the document original while print 229 has a pair of images 232, 233 representing the page frames 176 of a signature. By using left and right scrolling icons 235, 236 and top and bottom scrolling icons 238, 239, the position of the images 232, 233 on print 229 are adjusted.

Referring to FIGS. 8A-8D, printing system 2 in response to the signature programming instructions, splits the long edge side of the print media 108 at the fold line 179. The inside margin 180-1 is applied to each side of foldline 179, establishing the width of gutter 177. The trim selection is applied together with the outside, top, and bottom page margins 180-2, 180-3, 180-4 to establish page frame 176. The image is fitted within the page frame, with the image centered.

Referring to FIGS. 18 and 19, where signatures 170 are assembled to form segments 174 and segments 174 further assembled to form books 175, extra wrap around room must be provided for if obscuring of portions of the image adjacent the foldline is to be avoided. To accommodate this, the operator selects and programs in an intra-segment signature shift designed to maintain the visual center of the page frames 176 of each signature 170 so that the images are not obscured when the signature is folded while preventing parts of the image from being cut off when the signature is trimmed. To do this, the operator actuates Signature Shift icon 225-3 on "Special" scorecard 152". This displays Shift scrolling icon 242 together with a window 244 in which the amount of intra-segment shift programmed is displayed.

Using icon 242, the desired intra-segment shift 245 increment (x) is programmed. From the previously calculated number S1 of signatures in each set, the system automatically adds the shift increment x to the inside margins 180-1 of each page frame 176 on both sides of the signature starting with the second signature in the set. The system steps the shift increment x by one (i.e., 2x, 3x, etc) for each succeeding signature after the second signature 170-2. Thus, the center margins of the four page frames on the next outer signature 170-2 following centerfold signature 170-1 are shifted away from foldline 179 by the intra-segment shift increment x, the center margins of the four page frames of the next outer signature 170-3 shifted away by twice (2x) the intra-segment shift 245, and so forth and so on for all of the signatures in the set.

To avoid obscuring parts of the print image where segments 174 are assembled together to form a book 175, a further shift (x'), referred to as an inter-segment shift 248, is made in which the page frame 176 is further shifted away from foldline 179 to maintain a visual center throughout the book and prevent the images within the other signature segments from being obscured by the binding. The inter-segment shift increment x' further increases the gutter margin allocated to segments 174 of the book, allowing the book 175 to open easily. For this purpose, the system calculates the inter-segment shift 248 required and adds the extra shift increment x' to the inside margin 180-1 of the page frames comprising each segment 174 as required. The system steps the added shift increment x' by one for for the pages of each succeeding segment after the second segment 174-2. Thus, in the next two outer segments 174-2 on each side of centerfold segment 174-1, all the page frames of the segments 179-2 are additionally shifted away from foldline 179 by the inter-segment shift increment x', the page frames of the next pair of outer segments 174-3 are shifted away by twice (2x) the inter-segment shift 248, and so forth and so on for all of the segments in the book. As a result, the net distance from foldline 179 for any page frame is the sum of the inter-segment shift for that segment, the intra-segment shift for that signature, and the gutter.

As described, when programming a signature print job, the operator specifies the various parameters that comprise the signature layout using the signature programming selections displayed on touchscreen 62. Inasmuch as the parameters selected may result in a change in image size, after all of the shifts are applied, the images are isomorphically scaled to fit within the page frame and centered on the page. For this, the last image page (i.e., from the outermost signature in a segment where only a single segment is formed or the outermost signature in the outermost segment of a multi-segment book) is used as the scaling factor from which all images are placed for printing.

Image data for use in printing signatures may be derived by scanning document originals using scanner 6, input from a remote source via net 5, created from image data previously stored in system 2, or input via streaming tape, floppy disk, etc.

"MRSignatureImpl." PROGRAM (Copyright (C) 1987, 1988, 1989, 1990, Xerox Corporation—All Rights Reserved) in the attached APPENDIX is a program for implementing signature jobs programmed in the manner described.

While the invention has been described with reference to the structure disclosed, it is not confined to the details set forth, but is intended to cover such modifications or changes as may come within the scope of the following claims.

APPENDIX

MRSignatureImpl: PROGRAM

-- Copyright (C) 1987, 1988, 1989, 1990 by Xerox Corporation. All rights reserved.

```
BEGIN

-- TYPES --

ErrorType: TYPE = {imageError, none, pageError};

Position: TYPE = {bottom, left, right, top};

State: PUBLIC TYPE = MRSignatureInternal.State;
StatePtr: TYPE = LONG POINTER TO State;

-- SIGNALS --

Error: PUBLIC SIGNAL [problem: SignatureUtility.Problem] = CODE;

-- CONSTANTS -- epsilon: CARDINAL = 33;

pagesPerSheet: CARDINAL = 2;

-- EventLogger events --
startSigJob: CARDINAL = 401;
endSigJob: CARDINAL = 402;
startSigPage: CARDINAL = 411;
endSigPage: CARDINAL = 412;

-- GLOBALS -- absolutePositioning: BOOLEAN ← FALSE;

-- PUBLIC PROCEDURES FOR SignatureUtility.mesa INTERFACE --

Free: PUBLIC PROCEDURE [statePtr: StatePtr] =
  {zone: UNCOUNTED ZONE ← statePtr.zone;

MRExtraLogger.LogEvent [module: signature, event: cleanUp,
    id: statePtr.jobID];
  IF statePtr.back # NIL THEN zone.FREE[@statePtr.back];
```

```
IF statePtr.front # NIL THEN zone.FREE[@statePtr.front];
zone.FREE[@statePtr];
EventLogger.Log[endSigJob];
}; « Free »

GetNextSheet: PUBLIC PROCEDURE [statePtr: StatePtr, lockID:
JobBackUp.LockID]
    RETURNS [back: SignatureUtility.SignatureSidePtr ← NIL,
        front: SignatureUtility.SignatureSidePtr ← NIL,
            lastSheet: BOOLEAN ← FALSE] =

{ENABLE Error = >
{ErrorLogger[getNextSheetComplete,problem,statePtr.jobID];

IF (statePtr.back # NIL)
            THEN statePtr.zone.FREE[@statePtr.back];

IF (statePtr.front # NIL)
            THEN statePtr.zone.FREE[@statePtr.front];

EventLogger.Log[endSigPage];
            };

currentMediaIndex, currentSegmentNo, currentSheetNo: CARDINAL;
  delta: INTEGER;
  lCode: CARDINAL;
  lErrorType: ErrorType ← none;
  mediaIndexFlag: BOOLEAN ← FALSE;
  numberOfPages: CARDINAL;
  foreTarget, rearTarget: Page.SignatureTarget;
  sd: Page.SignatureData;

EventLogger.Log[startSigPage];
  MRExtraLogger.LogEvent[module: signature, event: getNextSheet,
   id: statePtr.jobID, code1: statePtr.nextSheet.segmentNumber,
        code2: statePtr.nextSheet.sheetNumber];

back ← front ← NIL;

IF ((numberOfPages ← statePtr.parameters.numberOfPages) = 0)
  THEN ERROR Error [[zeroPageJob[]]];

back ← statePtr.zone.NEW[SignatureUtility.SignatureSide];
  front ← statePtr.zone.NEW[SignatureUtility.SignatureSide];

currentSheetNo ← statePtr.nextSheet.sheetNumber;
  currentSegmentNo ← statePtr.nextSheet.segmentNumber;

IF (currentSheetNo > statePtr.sheetsPerSegment OR currentSheetNo =
0)
    THEN {ERROR Error [[fatalError[code: MRSignatureInternal.clientError,
                                    subCode:
MRSignatureInternal.badSheetNum]]];
            };

IF(currentSegmentNo > statePtr.parameters.numberOfSegments OR
      currentSegmentNo = 0)
```

```
THEN {ERROR Error [[fatalError[code: MRSignatureInternal.clientError,
                                         subCode:
MRSignatureInternal.badSegNum]]];
       };

IF (statePtr.initialize)
   THEN {statePtr.foreNo ←
         IF statePtr.oneToN THEN
              (statePtr.sheetsPerSegment + currentSheetNo)
              ELSE
         ((currentSegmentNo-1)*pagesPerSheet*statePtr.sheetsPerSegment)
+
           (statePtr.sheetsPerSegment - currentSheetNo + 1);

statePtr.rearNo ←
       IF statePtr.oneToN THEN
           (statePtr.sheetsPerSegment - currentSheetNo + 1)
           ELSE
           ((currentSegmentNo-
1)*pagesPerSheet*statePtr.sheetsPerSegment) +
           (statePtr.sheetsPerSegment + currentSheetNo);

[foreTarget: foreTarget,
               rearTarget: rearTarget,
               mediaIndexFlag: mediaIndexFlag] ← InitializeTargets [
                  covers: statePtr.covers,
                       foreNo: statePtr.foreNo,
                  rearNo: statePtr.rearNo,
                       numPages: numberOfPages,
                  sheetNo: currentSheetNo,
                  sheetsPerSegment: statePtr.sheetsPerSegment,
                       oneToN: statePtr.oneToN];

currentMediaIndex ← IF (mediaIndexFlag)
                                        THEN statePtr.mediaIndexCover
                                        ELSE statePtr.mediaIndexSegment;
        statePtr.initialize ← FALSE;
          }

ELSE {IF (statePtr.covers # none)
             THEN {hasBackCover: BOOLEAN ← NOT (statePtr.covers =
front);
                    foreTarget ←
           IF statePtr.oneToN THEN
                       IF currentSheetNo = statePtr.sheetsPerSegment
                       AND hasBackCover THEN
                       [last[]]
                       ELSE SELECT statePtr.foreNo FROM
                              > numberOfPages - 1 = > [none[]],
                              < = statePtr.rearNo = > [none[]],
                       ENDCASE = > [handle[page: statePtr.back.page1]]
              ELSE
                    SELECT statePtr.foreNo FROM
                           > numberOfPages-1 = > [none[]],
                    ENDCASE = > [handle[page: statePtr.back.page1]];
```

```
                            rearTarget ←
            IF statePtr.oneToN THEN
                    SELECT statePtr.rearNo FROM
                            > numberOfPages-1 = > [none[]],
                    ENDCASE = > [handle[page: statePtr.back.page2]]
            ELSE
                    SELECT statePtr.rearNo FROM
                            > numberOfPages-1 = > [none[]],
                            < = statePtr.foreNo = > [none[]],
                            = numberOfPages-1 = > [handle[
                               page: Page.GetLast[lockID ! Page.Error
 = > {
                                  lErrorType ← pageError; lCode ←
code.ORD;
                                  CONTINUE}]]],
                    ENDCASE = > [handle[page: statePtr.back.page2]];

IF (statePtr.oneToN AND currentSheetNo = 1)
                    OR (NOT statePtr.oneToN
                       AND currentSheetNo = statePtr.sheetsPerSegment)
                    THEN currentMediaIndex ←
statePtr.mediaIndexCover
                    ELSE currentMediaIndex ←
statePtr.mediaIndexSegment;

IF (lErrorType = pageError) THEN DoError[lErrorType,
lCode];
                    }

ELSE IF (statePtr.newSegment) -- never in oneToN
            THEN {foreTarget ← SELECT statePtr.foreNo FROM
                            > numberOfPages = > [none[]],
                            ENDCASE = > [number[num:
statePtr.foreNo]];

rearTarget ← SELECT statePtr.rearNo FROM
                       > numberOfPages = > [none[]],
                       = numberOfPages = > [last[]],
                            ENDCASE = > [number[num:
statePtr.rearNo]];

currentMediaIndex ← statePtr.mediaIndexSegment;
                    }

ELSE {foreTarget ←
                    IF statePtr.oneToN THEN
                       SELECT statePtr.foreNo FROM
                            > numberOfPages = > [none[]],
                            = numberOfPages = > [last[]],
                            ENDCASE = >
[handle[page:statePtr.back.page1]]
                       ELSE
                         SELECT statePtr.foreNo FROM
                            > numberOfPages = > [none[]],
                            ENDCASE = >
[handle[page:statePtr.back.page1]];
```

```
            rearTarget ←
              IF statePtr.oneToN THEN
                SELECT statePtr.rearNo FROM
                      > numberOfPages = > [none[]],
                      ENDCASE = >
[handle[page:statePtr.back.page2]]
                ELSE
                  SELECT statePtr.rearNo FROM
                      > numberOfPages = > [none[]],
                      = numberOfPages = > [last[]],
                      ENDCASE = >
[handle[page:statePtr.back.page2]];

currentMediaIndex ← statePtr.mediaIndexSegment;
              };
      };

statePtr.thisSheet ← [segmentNumber: currentSegmentNo,
                          sheetNumber: currentSheetNo];

sd ← Page.GetSignatureData [nextTarget: foreTarget, prevTarget:
rearTarget,
        lockID: lockID ! Image.Error = > {IErrorType ← imageError;
                                          ICode ← code.ORD;
                                          CONTINUE;
                                          };

Page.Error = > {IErrorType ← pageError;
                                        ICode ← code.ORD;
                                        CONTINUE;
                                        }];

IF (IErrorType # none) THEN DoError[IErrorType, ICode];
    statePtr.back ↑ ← [mediaIndex: currentMediaIndex,
                       pageNum: [none[]],
                       plex: duplex, image1: sd.nextImageFront,
                       box1: sd.nextImageFrontBox,
                       page1: sd.nextPage,
                       side1: front,
                       t1: Transformation.Identity, image2: sd.prevImageBack,
                       box2: sd.prevImageBackBox,
                       page2: sd.prevPage,
                       side2: back,
                       t2: Transformation.Identity];

statePtr.front ↑ ← [mediaIndex: currentMediaIndex,
                        pageNum: [none[]],
                        plex: simplex, image1: sd.nextImageBack,
                        box1: sd.nextImageBackBox,
                        page1: sd.nextPage,
```

```
            side1: back,
            t1: Transformation.Identity, image2: sd.prevImageFront,
            box2: sd.prevImageFrontBox,
            page2: sd.prevPage,
            side2: front,
            t2: Transformation.Identity];

MakeSide [lockID: lockID, side: back, statePtr: statePtr];
MakeSide [lockID: lockID, side: front, statePtr: statePtr];

back ↑ ← statePtr.back ↑ ;
front ↑ ← statePtr.front ↑ ;

IF statePtr.oneToN THEN
  lastSheet ← (currentSheetNo = statePtr.sheetsPerSegment)
ELSE
  lastSheet ← (currentSegmentNo = 1 AND currentSheetNo = 1);

-- Set up for the next sheet --
delta ← IF statePtr.oneToN THEN 1 ELSE -1;
currentMediaIndex ← statePtr.mediaIndexSegment;
currentSheetNo ← currentSheetNo + delta;
IF (currentSheetNo = 0) -- can't happen in oneToN
THEN {currentSegmentNo ← currentSegmentNo - 1;
        currentSheetNo ← statePtr.sheetsPerSegment;
            statePtr.foreNo ← ((currentSegmentNo-1) * pagesPerSheet *
                currentSheetNo) + 1;

statePtr.rearNo ← ((currentSegmentNo)  * pagesPerSheet *
                currentSheetNo);

statePtr.newSegment ← TRUE;
            }

ELSE {statePtr.foreNo ← statePtr.foreNo + 1;
            statePtr.rearNo ← statePtr.rearNo - 1;
            statePtr.newSegment ← FALSE;
            };

statePtr.nextSheet ← [segmentNumber: currentSegmentNo,
                        sheetNumber: currentSheetNo];

MRExtraLogger.LogEvent [module: signature, event:
getNextSheetComplete,
      id: statePtr.jobID];

EventLogger.Log [endSigPage];
    -- End Set up for the next sheet --
    }; « GetNextSheet »

GetOneSide: PUBLIC PROCEDURE [lockID: JobBackUp.LockID,
    segNum: CARDINAL, sheetNum: CARDINAL, sheetSide: Page.Side,
    side: SignatureUtility.SignatureSidePtr, zone: UNCOUNTED ZONE]
RETURNS [] =
```

```
{statePtr: StatePtr ← zone.NEW[State];

{ENABLE Error = > {ErrorLogger [getOneSideComplete, problem,
statePtr.jobID];
                        zone.FREE[@statePtr];
            };

lCode: CARDINAL;
lErrorType: ErrorType ← none;
media: PublicPrinting.InternalMedia;
mediaIndex: CARDINAL;
mediaIndexFlag: BOOLEAN;
plex: JobQ.Plex;
numberOfPages, segmentCount, segmentDesired: CARDINAL;
sheetDesired, sheetsPerSegment: CARDINAL;

foreTarget, rearTarget: Page.SignatureTarget;
sd: Page.SignatureData;
statePtr.covers ← JobQ.GetCovers [lockID: lockID];
statePtr.jobID ← JobQ.GetJobID [lockID: lockID];
statePtr.pageNumParms ← JobQ.GetPageNumbering [lockID: lockID];
statePtr.parameters ← JobQ.GetSignatureParms [lockID: lockID];
numberOfPages ← JobQ.GetNumberOfPages [lockID];
statePtr.parameters.numberOfPages ← numberOfPages;
statePtr.zone ← zone;

MRExtraLogger.LogEvent [module: signature, event: getOneSide,
    id: statePtr.jobID, code1: segNum, code2: sheetNum,
        code3: ORD[sheetSide], code4: numberOfPages,
        code5: statePtr.parameters.numberOfSegments];

IF (numberOfPages = 0)
THEN {ERROR Error [[fatalError[code: MRSignatureInternal.clientError,
                        subCode:
MRSignatureInternal.zeroPageJob]]];
        };

[media: media, plex: plex] ← JobQ.GetMediaAndPlex [lockID: lockID,
    zone: zone];

InitializeInternal [lockID: lockID, media: media, statePtr: statePtr
    ! Error = > {FreeMedia [media: media, zone: zone];}];

FreeMedia [media: media, zone: zone];

segmentCount ← statePtr.parameters.numberOfSegments;
sheetsPerSegment ← statePtr.sheetsPerSegment;

IF (sheetNum > sheetsPerSegment OR sheetNum = 0)
THEN {ERROR Error [[fatalError[code: MRSignatureInternal.clientError,
                        subCode:
MRSignatureInternal.badSheetNum]]];
        };
```

```
IF (segNum > segmentCount OR segNum = 0)
THEN {ERROR Error [[fatalError[code: MRSignatureInternal.clientError,
                                       subCode:
MRSignatureInternal.badSegNum]]];
     };

IF statePtr.oneToN
THEN {segmentDesired ← segNum;
      sheetDesired ← sheetNum;
      statePtr.foreNo ← (sheetsPerSegment + sheetDesired);
      statePtr.rearNo ← (sheetsPerSegment - sheetDesired + 1)}
ELSE {segmentDesired ← segmentCount - (segNum - 1);
      sheetDesired ← sheetsPerSegment - (sheetNum - 1);
      statePtr.foreNo ←
           ((segmentDesired-1) * pagesPerSheet * sheetsPerSegment) +
           (sheetsPerSegment - sheetDesired + 1);
    statePtr.rearNo ←
           ((segmentDesired-1) * pagesPerSheet * sheetsPerSegment) +
           (sheetsPerSegment + sheetDesired)};

[foreTarget: foreTarget,
     rearTarget: rearTarget,
     mediaIndexFlag: mediaIndexFlag] ← InitializeTargets [
        covers: statePtr.covers,
        foreNo: statePtr.foreNo,
        rearNo: statePtr.rearNo,
        numPages: numberOfPages,
        sheetNo: sheetDesired,
        sheetsPerSegment: sheetsPerSegment,
        oneToN: statePtr.oneToN];

mediaIndex ← IF (mediaIndexFlag)
                THEN statePtr.mediaIndexCover
                ELSE statePtr.mediaIndexSegment;

statePtr.thisSheet ← [segmentNumber: segmentDesired,
                      sheetNumber: sheetDesired];

sd ← Page.GetSignatureData [nextTarget: foreTarget, prevTarget:
rearTarget,
     lockID: lockID ! Image.Error = > {lErrorType ← imageError;
                                        lCode ← code.ORD;
                                        CONTINUE;
                                       };

Page.Error = > {lErrorType ← imageError;
                                          lCode ← code.ORD;
                                          CONTINUE;
                                         }];

IF (lErrorType # none)
THEN DoError[lErrorType, lCode];

statePtr.back ← statePtr.front ← side;
IF (sheetSide = back)
```

```
THEN {side ↑ ← [mediaIndex: mediaIndex,
                pageNum: [none[]],
                plex: duplex, image1: sd.nextImageFront,
                    box1: sd.nextImageFrontBox,
                    page1: sd.nextPage,
                    side1: front,
                    t1: Transformation.Identity, image2: sd.prevImageBack,
                        box2: sd.prevImageBackBox,
                        page2: sd.prevPage,
                        side2: back,
                        t2: Transformation.Identity];

MakeSide [lockID: lockID, side: back, statePtr: statePtr];
        }

ELSE {side ↑ ← [mediaIndex: mediaIndex,
                pageNum: [none[]],
                plex: simplex, image1: sd.nextImageBack,
                    box1: sd.nextImageBackBox,
                    page1: sd.nextPage,
                    side1: back,
                    t1: Transformation.Identity, image2: sd.prevImageFront,
                    box2: sd.prevImageFrontBox,
                    page2: sd.prevPage,
                    side2: front,
                    t2: Transformation.Identity];

MakeSide [lockID: lockID, side: front, statePtr: statePtr];
        };

};

MRExtraLogger.LogEvent [module: signature, event: getOneSideComplete,
        id: statePtr.jobID];

zone.FREE [@statePtr];
    }; « GetOneSide »

GetSourcePages: PUBLIC PROCEDURE [lockID: JobBackUp.LockID,
    segNum: CARDINAL, sheetNum: CARDINAL, sheetSide: Page.Side]
    RETURNS [page1, page2: Page.Handle ← Page.nullHandle,
        page1Side, page2Side: Page.Side ← front] =
    {jobID: JobID.ID ← JobQ.GetJobID [lockID: lockID];

{ENABLE Error = > ErrorLogger[getSourcePagesComplete, problem, jobID];
        lCode, temp: CARDINAL;
```

```
covers: JobQ.Covers ← JobQ.GetCovers [lockID: lockID];
error, oneToN: BOOLEAN ← FALSE;
numPages: CARDINAL ← JobQ.GetNumberOfPages [lockID: lockID];
    sigParms: MRSignature.Parameters ← JobQ.GetSignatureParms [lockID:
lockID];
    sheetCount: CARDINAL ← (numPages + pagesPerSheet - 1) /
pagesPerSheet;
    segmentCount: CARDINAL ← IF (sigParms.numberOfSegments = 0)
                            THEN 1 ELSE
sigParms.numberOfSegments;
    sheetsPerSegment: CARDINAL ← (sheetCount + segmentCount -
1)/segmentCount;
    foreNo, rearNo, sheetDesired, segmentDesired: CARDINAL;

MRExtraLogger.LogEvent [module: signature, event: getSourcePages,
      id: jobID, code1: segNum, code2: sheetNum, code3: ORD[sheetSide],
          code4: numPages, code5: sigParms.numberOfSegments];

oneToN ← IF segmentCount > 1 THEN FALSE ELSE
CheckOneToN[lockID: lockID];

IF (sheetNum > sheetsPerSegment OR sheetNum = 0)
    THEN {ERROR Error [[fatalError[code: MRSignatureInternal.clientError,
                                    subCode:
MRSignatureInternal.badSheetNum]]];
        };

IF (segNum > segmentCount OR segNum = 0)
    THEN {ERROR Error [[fatalError[code: MRSignatureInternal.clientError,
                                    subCode:
MRSignatureInternal.badSegNum]]];
        };

IF oneToN
    THEN {segmentDesired ← segNum;
        sheetDesired ← sheetNum}
    ELSE {segmentDesired ← segmentCount - (segNum - 1);
        sheetDesired ← sheetsPerSegment - (sheetNum - 1)};

foreNo ← ((segmentDesired - 1) * pagesPerSheet * sheetsPerSegment)
+
            (sheetsPerSegment - sheetDesired + 1);

rearNo ← ((segmentDesired - 1) * pagesPerSheet * sheetsPerSegment)
+
            (sheetsPerSegment + sheetDesired);

IF oneToN
    THEN {temp ← foreNo;
        foreNo ← rearNo;
        rearNo ← temp};

IF (covers = none)
```

```
                THEN {-- Initialize for Single Segment Without Covers or
                   -- MultiSegment Jobs»
                      page1 ← SELECT foreNo FROM
                                          > numPages = > Page.nullHandle,
                                        = numPages = > Page.GetLast[lockID !
                                                     Page.Error = > {error ← TRUE;

ICode ← code.ORD;

CONTINUE}],

= 1 = > Page.GetFirst[lockID !
                                                     Page.Error = > {error ← TRUE;

ICode ← code.ORD;

CONTINUE}],

ENDCASE = > Page.GetPageNo[lockID,
           foreNo !
                                                     Page.Error = > {error ← TRUE;

ICode ← code.ORD;

CONTINUE}];
               IF (error) THEN DoError[pageError, ICode];

page2 ← SELECT rearNo FROM
                                          > numPages = > Page.nullHandle, = numPages = > Page.GetLast[lockID !
                                                     Page.Error = > {error ← TRUE;

ICode ← code.ORD;

CONTINUE}],

ENDCASE = > Page.GetPageNo[lockID,
           rearNo !
                                                     Page.Error = > {error ← TRUE;

ICode ← code.ORD;

CONTINUE}];
               IF (error) THEN DoError[pageError, ICode];
               }
       ELSE IF (sheetDesired = sheetsPerSegment)
        THEN {-- Initialize the Cover of a Single Segment Job With Covers
              SELECT numPages FROM
                           0 = > {page1 ← Page.nullHandle;
                                  page2 ← Page.nullHandle;
                                  };

1 = > {page1 ← Page.GetFirst[lockID !
```

```
                                    Page.Error => {error ← TRUE;
                                                   lCode ←
code.ORD;
                                                   CONTINUE}];

IF (error) THEN DoError[pageError, lCode];

page2 ← Page.nullHandle;
                    };

ENDCASE => {page1 ← Page.GetFirst[lockID !
                            Page.Error => {error ← TRUE;
                                           lCode ←
code.ORD;
                                           CONTINUE}];

IF (error) THEN DoError[pageError, lCode];

page2 ← Page.GetLast[lockID !
                            Page.Error => {error ← TRUE;
                                           lCode ←
code.ORD;
                                           CONTINUE}];

IF (error) THEN DoError[pageError, lCode];
                    };
        }
    ELSE {-- Initialize for a nonCover page of a Single Segment Job
          -- With Covers
          page1 ← SELECT foreNo FROM
                    > numPages - 1 => Page.nullHandle,
                    ENDCASE => Page.GetPageNo[lockID,
foreNo !
                                Page.Error => {error ← TRUE;
                                               lCode ←
code.ORD;
CONTINUE}];

IF (error) THEN DoError[pageError, lCode];

page2 ← SELECT rearNo FROM
                    > numPages - 1 => Page.nullHandle,
                    <= foreNo => Page.nullHandle,
                        ENDCASE => Page.GetPageNo[lockID,
rearNo !
                                Page.Error => {error ← TRUE;
                                               lCode ←
code.ORD;
CONTINUE}];
            IF (error) THEN DoError[pageError, lCode];
            };

IF (sheetSide = front)
```

```
    THEN {page1Side ← back; page2Side ← front;}
    ELSE {page1Side ← front; page2Side ← back;};

};

MRExtraLogger.LogEvent [module: signature, event:
getSourcePagesComplete,
     id: jobID];
   }; « GetSourcePages »

Init: PUBLIC PROCEDURE [lockID: JobBackUp.LockID,
    jobRootPtr: SignatureUtility.JobRootPtr,
    media: PublicPrinting.InternalMedia,
    paramsPtr: MRSignature.ParamsPtr, zone: UNCOUNTED ZONE]
    RETURNS [statePtr: StatePtr ← NIL] =
    {statePtr ← zone.NEW [State];
    statePtr.back ← statePtr.front ← NIL;

EventLogger.Log [startSigJob];

statePtr.initialize ← TRUE;
    statePtr.parameters ← paramsPtr ↑ ;
    statePtr.zone ← zone;

statePtr.jobID ← JobQ.GetJobID[lockID: lockID];
    statePtr.covers ← jobRootPtr.covers;
    statePtr.oneToN ← jobRootPtr.markOneToN OR System.switches['L] =
down;
    statePtr.pageNumParms ← jobRootPtr.pageNumbering;
    statePtr.parameters.numberOfPages ← jobRootPtr.numberOfPages;

MRExtraLogger.LogEvent [module: signature, event: init,
     id: statePtr.jobID, code1: statePtr.parameters.numberOfPages,
        code2: statePtr.parameters.numberOfSegments];

IF (jobRootPtr.numberOfPages > 0)
     THEN InitializeInternal [lockID: lockID, media: media, statePtr: statePtr
       ! Error = > {ErrorLogger[initComplete, problem, statePtr.jobID];
                    zone.FREE[@statePtr]; EventLogger.Log
[endSigJob]}];

statePtr.back ← zone.NEW [SignatureUtility.SignatureSide];
    statePtr.front ← zone.NEW [SignatureUtility.SignatureSide];

MRExtraLogger.LogEvent [module: signature, event: initComplete,
    id: statePtr.jobID];
    };

Reset: PUBLIC PROCEDURE [lastSegNum: CARDINAL, lastSheetNum:
CARDINAL,
    statePtr: StatePtr] =
    {segNum, sheetNum: CARDINAL;
    delta: INTEGER;

-- IDENTIFY THE LAST SUCCESSFULLY POST PARSED SHEET.
    IF statePtr.oneToN
```

```
    THEN {segNum ← lastSegNum;
          sheetNum ← lastSheetNum;
          delta ← 1}
    ELSE {segNum ← statePtr.parameters.numberOfSegments -
(lastSegNum - 1);
          sheetNum ← statePtr.sheetsPerSegment - (lastSheetNum - 1);
          delta ← -1};

-- FIND THE NEXT SEQUENTIAL SHEET TO GENERATE.
    sheetNum ← sheetNum + delta;
    IF (sheetNum = 0) -- can't happen oneToN
    THEN {segNum ← segNum - 1;
       sheetNum ← statePtr.sheetsPerSegment;
          };

statePtr.nextSheet ← [segmentNumber: segNum,
                          sheetNumber: sheetNum];

MRExtraLogger.LogEvent [module: signature, event: reset,
       id: statePtr.jobID, code1: lastSegNum, code2: lastSheetNum,
          code3: segNum, code4: sheetNum];

statePtr.initialize ← TRUE;
    }; « Reset »

-- PUBLIC PROCEDURES FOR MRSignatureInternal.mesa INTERFACE --

GetShift: PUBLIC PROCEDURE [statePtr: StatePtr]
   RETURNS [shift: CARDINAL] =
   {segmentIndex: CARDINAL;

-- calculate distance from the CENTER segment
    segmentIndex ← statePtr.parameters.numberOfSegments / 2;
    IF segmentIndex < statePtr.thisSheet.segmentNumber
    THEN {segmentIndex ← statePtr.thisSheet.segmentNumber -
(segmentIndex + 1);

-- even number of segments: no center segment
              IF (statePtr.parameters.numberOfSegments MOD 2) = 0
              THEN segmentIndex ← segmentIndex + 1;
          }
    ELSE segmentIndex ← (segmentIndex + 1) -
statePtr.thisSheet.segmentNumber;

-- calculate creeping shift
    -- (statePtr.thisSheet.sheetNumber = 1 is the centerfold)
    -- (segmentIndex = 0 is the center segment)
    shift ← (statePtr.thisSheet.sheetNumber - 1) *
       statePtr.parameters.shiftIntraSegment +
          segmentIndex * statePtr.parameters.shiftInterSegment;
   }; « GetShift »

PassError: PUBLIC PROCEDURE [problem: SignatureUtility.Problem] =
   {ERROR Error [problem: problem]};
```

-- LOCAL PROCEDURES --

AdjustPageNum: PROCEDURE [sigSide: SignatureUtility.SignatureSidePtr]
=
  {-- Adjust each page number position to be relative to its associated
  -- page frame. image 1 is page number A, image 2 is page number B.
  WITH sigSide.pageNum SELECT FROM
      none = > NULL;
          normal = > ERROR; -- NEEDS ERROR
      signature = > {WITH pageA SELECT FROM
                  blank = > NULL;
                  valid = > {position.coarseLoc.horzLoc ←
                              IF
((INTEGER[position.coarseLoc.horzLoc] -

0)
                                          Real.RoundI[sigSide.t1.c]) <

THEN 0
                                      ELSE
position.coarseLoc.horzLoc -

Real.RoundC[sigSide.t1.c];

position.coarseLoc.vertLoc ←
                              IF
((INTEGER[position.coarseLoc.vertLoc] -

Real.RoundI[sigSide.t1.f]) <
0)

THEN 0
                                      ELSE position.coarseLoc.vertLoc
-
                                          Real.RoundC[sigSide.t1.f];
                              };
              ENDCASE = > ERROR Error [[fatalError[
MRSignatureInternal.fellOffEndCase,
MRSignatureInternal.adjustPageNum]]];

WITH pageB SELECT FROM
                      blank = > NULL;
                      valid = > {position.coarseLoc.horzLoc ←
                              IF
((INTEGER[position.coarseLoc.horzLoc] -

Real.RoundI[sigSide.t2.c]) <
0)
                                      THEN 0
                                      ELSE
  position.coarseLoc.horzLoc -

Real.RoundC[sigSide.t2.c];

position.coarseLoc.vertLoc ←
                              IF
((INTEGER[position.coarseLoc.vertLoc] -

Real.RoundI[sigSide.t2.f]) <
     0)

```
                            THEN 0
                            ELSE position.coarseLoc.vertLoc Real.RoundC[sigSide.t2.f];
            };

ENDCASE = > ERROR Error [[fatalError[
MRSignatureInternal.fellOffEndCase,

MRSignatureInternal.adjustPageNum]]];
            };

ENDCASE = > ERROR Error
[[fatalError[MRSignatureInternal.fellOffEndCase,

MRSignatureInternal.adjustPageNum]]];

}; « AdjustPageNum »

CheckOneToN: PROCEDURE [lockID: JobBackUp.LockID]
    RETURNS [isOneToN: BOOLEAN] =

BEGIN
 jobRoot: JobQ.JobRoot;
 media: PublicPrinting.InternalMedia;
 mediaPtr: LONG POINTER TO ARRAY OF PublicPrinting.InternalMedium;
 medium: PublicPrinting.InternalMedium;
 jobRoot ← JobQ.GetJobRoot[lockID: lockID, zone: NIL];
 isOneToN ← jobRoot.markOneToN OR System.switches['L] = down;
 IF isOneToN THEN { -- must check foldline to see if override is required
         [media: media] ← JobQ.GetMediaAndPlex[
           lockID: lockID, zone: Heap.systemZone];
         mediaPtr ← media.BASE;
         medium ← mediaPtr[0];  -- all pages the same size
         IF medium.mediumDimensions.lengthInMillimeters >
           medium.mediumDimensions.widthInMillimeters
         THEN isOneToN ← FALSE; -- i.e. foldline is horizontal
         FreeMedia[media: media, zone: Heap.systemZone]};
 END; « CheckOneToN »

DoError: PROCEDURE [type: ErrorType, code: CARDINAL] =
  {SELECT type FROM
    imageError = > ERROR Error
[[fatalError[MRSignatureInternal.imageError, code]]];

pageError = > ERROR Error
[[fatalError[MRSignatureInternal.pageError, code]]];

ENDCASE;
   }; « DoError »

ErrorLogger: PROCEDURE [event: MRExtraLogger.Event,
            problem: SignatureUtility.Problem,
                   id: JobID.ID] =
```

```
{WITH problem SELECT FROM
   fatalError = > MRExtraLogger.LogEvent [module: signature, event: event,
                  id: id, code1: ORD[type], code2: code, code3: subCode];

fontProblem = > MRExtraLogger.LogEvent [module: signature, event: event,
                  id: id, code1: ORD[type],
                          code2: IF faulted THEN 1 ELSE 0];
          imageNotFound = > MRExtraLogger.LogEvent [module:
signature, event: event,
                  id: id, code1: ORD[type], code2: LOOPHOLE[page],
                          code3: ORD[side]];

logoNotFound = > MRExtraLogger.LogEvent [module:
signature, event: event,
                  id: id, code1: ORD[type], code2: LOOPHOLE[page],
                          code3: ORD[side]];

pageNumberTooLarge = > MRExtraLogger.LogEvent [module:
signature,
                  event: event, id: id, code1: ORD[type],
                          code2: tooBigByThisAmount];

rasterDSError = > MRExtraLogger.LogEvent [module: signature,
                          event: event, id: id, code1: ORD[type],
                          code2: LOOPHOLE[faultID],
                          code3: IF partOfLogo THEN 1 ELSE 0,
                          code4: LOOPHOLE[page], code5:
ORD[side]];

zeroPageJob = > MRExtraLogger.LogEvent [module: signature,
                          event: event, id: id, code1: ORD[type]];

spare = > MRExtraLogger.LogEvent [module: signature,event:
event, id: id,
                          code1: ORD[type]];

ENDCASE;
   }; « ErrorLogger »

FreeMedia: PROCEDURE [media: PublicPrinting.InternalMedia,
   zone: UNCOUNTED ZONE] =
   {mediaPtr: LONG POINTER TO ARRAY OF
PublicPrinting.InternalMedium;
    counter: CARDINAL;

mediaPtr ← media.BASE;
    counter ← media.LENGTH;

FOR i:CARDINAL IN [0..counter)
    DO IF (mediaPtr[i].name # NIL) THEN zone.FREE[@mediaPtr[i].name];
       IF (mediaPtr[i].message # NIL) THEN
zone.FREE[@mediaPtr[i].message];
       IF (mediaPtr[i].otherPaperType # NIL)
               THEN zone.FREE[@mediaPtr[i].otherPaperType];
```

```
IF (mediaPtr[i].otherColor # NIL)
    THEN zone.FREE[@mediaPtr[i].otherColor];
  ENDLOOP;

IF (mediaPtr # NIL) THEN zone.FREE[@mediaPtr];
}; « FreeMedia »

FreeMedium: PROCEDURE [medium: PublicPrinting.InternalMedium,
                      zone: UNCOUNTED ZONE] =
{IF (medium.name # NIL)
 THEN zone.FREE [@medium.name];

IF (medium.message # NIL)
 THEN zone.FREE [@medium.message];

IF (medium.otherPaperType # NIL)
 THEN zone.FREE [@medium.otherPaperType];

IF (medium.otherColor # NIL)
 THEN zone.FREE [@medium.otherColor];
}; « FreeMedium »

GetAbsoluteOffset: PROCEDURE [box: Image.Box, position: Position,
 side: Page.Side, statePtr: StatePtr]
 RETURNS [offsetX, offsetY:INTEGER] =
{gutter: CARDINAL;

gutter ← statePtr.parameters.marginGutter + GetShift [statePtr];

IF (statePtr.foldLine = vertical)
 THEN {-- foldline is parallel to the Y dimension
     offsetY ← statePtr.parameters.marginBottom +
         statePtr.parameters.trimOffset;

IF (position = right)
       THEN offsetX ← statePtr.halfSheetX + gutter

ELSE offsetX ← INTEGER[statePtr.halfSheetX] -
                        INTEGER[gutter + statePtr.pageFrameX];
     }
  ELSE {-- foldline is parallel to the X dimension
          offsetX ← statePtr.parameters.marginBottom +
                  statePtr.parameters.trimOffset;

IF (side = front)
       THEN {IF (position = top)
               THEN offsetY ← statePtr.halfSheetY + gutter ELSE offsetY ← INTEGER[statePtr.halfSheetY] -
                                  INTEGER[gutter +
statePtr.pageFrameY];
             }
         ELSE {IF (position = bottom)
               THEN offsetY ← statePtr.halfSheetY + gutter
```

```
              ELSE offsetY ← INTEGER[statePtr.halfSheetY] -
                                    INTEGER[gutter +
statePtr.pageFrameY];
            };
        };

« offset adjustment to center the input page in the page frame. »
    offsetX ← offsetX +
        (INTEGER[statePtr.pageFrameX]-INTEGER[box.xDimension]) / 2;

offsetY ← offsetY +
        (INTEGER[statePtr.pageFrameY]-INTEGER[box.yDimension]) / 2;
    }; « GetAbsoluteOffset »

GetPageFrameDims: PROCEDURE [paramsPtr: MRSignature.ParamsPtr,
    mediumDimensions: PublicPrinting.MediumDimensions]
    RETURNS [dimsX, dimsY: CARDINAL] =
    {maxGutter: CARDINAL;
    segmentsToShift, sheetCount, sheetsPerSegment, sheetsToShift:
CARDINAL;

dimsX ← paramsPtr.trimSizeX;
    dimsY ← paramsPtr.trimSizeY;

sheetCount ← (paramsPtr.numberOfPages + pagesPerSheet - 1) /
pagesPerSheet;

sheetsPerSegment ← (sheetCount + paramsPtr.numberOfSegments - 1)
/
        paramsPtr.numberOfSegments;

sheetsToShift ← sheetsPerSegment - 1;
    segmentsToShift ← paramsPtr.numberOfSegments / 2;

maxGutter ← paramsPtr.marginGutter + paramsPtr.shiftInterSegment
    segmentsToShift + paramsPtr.shiftIntraSegment * sheetsToShift;

-- this block decides where to apply the gutter margin,
    -- to the x dim (vertical gutter) or the y dim (horizontal gutter).
    IF mediumDimensions.lengthInMillimeters >
        mediumDimensions.widthInMillimeters
    THEN {-- horizontal foldline
            IF (dimsY < maxGutter + paramsPtr.marginOutside)
            THEN dimsY ← 0
            ELSE dimsY ← dimsY - maxGutter - paramsPtr.marginOutside;

IF (dimsX < CARDINAL[paramsPtr.marginTop +
paramsPtr.marginBottom])
            THEN dimsX ← 0
            ELSE dimsX ← dimsX - paramsPtr.marginTop -
paramsPtr.marginBottom;
        }
```

```
ELSE {-- vertical foldline
        IF (dimsX < maxGutter + paramsPtr.marginOutside)
        THEN dimsX ← 0
        ELSE dimsX ← dimsX - maxGutter - paramsPtr.marginOutside;

IF (dimsY < CARDINAL[paramsPtr.marginTop +
paramsPtr.marginBottom])
        THEN dimsY ← 0
        ELSE dimsY ← dimsY - paramsPtr.marginTop -
paramsPtr.marginBottom;
        };
};  « GetPageFrameDims »

GetRelativeOffset: PROCEDURE [box: Image.Box, position: Position,
  side: Page.Side, statePtr: StatePtr]
  RETURNS [offsetX, offsetY: INTEGER] =
  {shift: CARDINAL ← GetShift [statePtr];

SELECT position FROM
        left = >
          {offsetX ← statePtr.halfSheetX -
                (box.xPosition + shift + box.xDimension);
          offsetY ← box.yPosition;
          };

right = >
          {offsetX ← statePtr.halfSheetX + box.xPosition + shift;
          offsetY ← box.yPosition;
          };

ENDCASE «bottom or top» = >
          {IF ((side = back AND position = bottom) OR
            (side = front AND position = top))
          THEN {offsetX ← box.xPosition;
              offsetY ← statePtr.halfSheetY + box.yPosition + shift;
              }

ELSE {offsetX ← box.xPosition;
              offsetY ← statePtr.halfSheetY -
                        (box.yPosition + shift +
box.yDimension);
              };
        };
};  « GetRelativeOffset »

GetMediaIndex: PROCEDURE [media: PublicPrinting.InternalMedia,
  medium: PublicPrinting.InternalMedium]
  RETURNS [mediaIndex: CARDINAL] =
  {mediaPtr: LONG POINTER TO ARRAY OF
PublicPrinting.InternalMedium;

mediaPtr ← media.BASE;

FOR mediaIndex IN [0..media.LENGTH)
```

```
   DO IF (PublicPrintUtility.CompareMedium[mediaPtr[mediaIndex],
medium]) THEN
       EXIT;
    ENDLOOP;
   }; « GetMediaIndex »

ImposeFrame: PROCEDURE [box: Image.Box, image: Image.Handle,
   lockID: JobBackUp.LockID, page: Page.Handle, pageSide: Page.Side,
   position: Position, side: Page.Side, statePtr: StatePtr]
   RETURNS [t: Transformation.Matrix] =
   {offsetX, offsetY: INTEGER;
    rotate: BOOLEAN;
    nonLogoSuperBox: Image.Box ← [0,0,0,0];

« used to correct for PMS #200219 until relative positioning can be used
»
    GetNonLogoSuperBox: Image.EnumerateProc =
      {IBox: Image.Box ← Image.GetBox[object: object, location: location];
       IType: Image.ObjectType ← Image.GetObjectType [object: object,
                                                      location:
location];

IF (IType = composite) THEN RETURN;

nonLogoSuperBox ← JoinBoxes[box1: nonLogoSuperBox, box2:
IBox]

}; « GetNonLogoSuperBox »

« need to have David add this to the Page.GetSignatureData macro »
 Page.EnumerateNonLogoImages [page: page, side: pageSide,
     proc: GetNonLogoSuperBox, lockID: lockID];

IF (absolutePositioning) «temporary fallback option»
   THEN [offsetX, offsetY] ← GetAbsoluteOffset [box: nonLogoSuperBox,
           position: position, side: side, statePtr: statePtr]

ELSE «RelativePositioning: product intent»
     [offsetX, offsetY] ← GetRelativeOffset [box: nonLogoSuperBox,
           position: position, side: side, statePtr: statePtr];

rotate ← IF (statePtr.foldLine = horizontal AND side = back)
          THEN TRUE ELSE FALSE;

box.xPosition ← offsetX - nonLogoSuperBox.xPosition;
 box.yPosition ← offsetY - nonLogoSuperBox.yPosition;

IF (rotate)
 THEN {box.xPosition ← ImagePerf.BandAlign [box,
                         ImagePerf.IsReverse[image, [job[lockID]]],
                         NOT ImagePerf.IsXFlip[image, [job[lockID]]]];

t ← [a: -1.0, e: -1.0,
    b: 0.0, d: 0.0,
```

```
                c: REAL[box.xPosition], f: REAL[box.yPosition],
                    form: zeroBandD];
    }

ELSE {box.xPosition ← ImagePerf.BandAlign [box,
                    ImagePerf.IsReverse[image, [job[lockID]]],
                    ImagePerf.IsXFlip[image, [job[lockID]]]];

t ← [a: 1.0, e: 1.0,
    b: 0.0, d: 0.0,
                c: REAL[box.xPosition], f: REAL[box.yPosition],
                    form: zeroBandD];
        };

TransformationOps.SetForm[@t];
    }; « ImposeFrame »

JoinBoxes: PROCEDURE[box1, box2: Image.Box] RETURNS [joined:
Image.Box] = {
  IF box1 = [0, 0, 0, 0] THEN RETURN[joined: box2];
  IF box2 = [0, 0, 0, 0] THEN RETURN[joined: box1];
  joined.xPosition ← MIN[box1.xPosition, box2.xPosition];
  joined.yPosition ← MIN[box1.yPosition, box2.yPosition];
  joined.xDimension ← MAX[
   box1.xPosition + box1.xDimension, box2.xPosition + box2.xDimension]
    - joined.xPosition;
  joined.yDimension ← MAX[
   box1.yPosition + box1.yDimension, box2.yPosition + box2.yDimension]
    - joined.yPosition}; « JoinBoxes »

InitializeInternal: PROCEDURE [lockID: JobBackUp.LockID,
   media: PublicPrinting.InternalMedia, statePtr: StatePtr] RETURNS [] =
   {lCode: CARDINAL;
   lErrorType: ErrorType ← none;
   page: Page.Handle;
   page1Plex: PublicPrinting.Plex ← duplex;
   pageParms: Page.Parameters;
   pnDelta: LONG CARDINAL;
   numberOfPages, segmentCount, sheetCount, sheetsPerSegment:
CARDINAL;
   wv: LONG CARDINAL;

numberOfPages ← statePtr.parameters.numberOfPages;

page ← Page.GetFirst [lockID: lockID !
       Page.Error = > {lErrorType ← pageError; lCode ← code.ORD;
CONTINUE}];

IF (lErrorType = pageError) THEN DoError[lErrorType, lCode];

page1Plex ← Page.GetPlex[lockID, page ! Page.Error = >
        {lErrorType ← pageError; lCode ← code.ORD; CONTINUE}];

IF (lErrorType = pageError) THEN DoError[lErrorType, lCode];
```

```
        pageParms ← Page.GetParameters [page: page, lockID: lockID,
              zone: statePtr.zone
              ! Page.Error = > {lErrorType ← pageError; lCode ← code.ORD;
CONTINUE}];

IF (lErrorType = pageError) THEN DoError[lErrorType, lCode];

SELECT TRUE FROM
          (statePtr.covers = none) = >
            {statePtr.medialndexSegment ← GetMediaIndex [media,
pageParms.medium];
             statePtr.medialndexCover ← 0;
            };

(numberOfPages < 2) = >
                {statePtr.medialndexSegment ← 0;
             statePtr.medialndexCover ← GetMediaIndex [media,
pageParms.medium];
            };

ENDCASE = > « (covers # none AND numberOfPages > = 2) »
                {statePtr.medialndexCover ← GetMediaIndex [media,
pageParms.medium];
                FreeMedium [pageParms.medium, statePtr.zone];

page ← Page.GetNext [target:page, lockID:lockID !
                Page.Error = > {lErrorType ← pageError;
                                    lCode ← code.ORD; CONTINUE}];

IF (lErrorType = pageError) THEN DoError[lErrorType, lCode];

pageParms ← Page.GetParameters [page:page, lockID:lockID,
                zone: statePtr.zone
                ! Page.Error = > {lErrorType ← pageError;
                                    lCode ← code.ORD; CONTINUE}];

IF (lErrorType = pageError) THEN DoError[lErrorType, lCode];

statePtr.medialndexSegment ← GetMediaIndex [media,
pageParms.medium];
            };

FreeMedium [pageParms.medium, statePtr.zone];

IF (pageParms.medium.mediumDimensions.lengthInMillimeters >
            pageParms.medium.mediumDimensions.widthInMillimeters)
        THEN statePtr.foldLine ← horizontal
        ELSE statePtr.foldLine ← vertical;

IF (statePtr.pageNumParms.valid)
        THEN {MRSignatureInternal.SetUpPageNumFonts [statePtr];

IF (page1Plex = simplex AND statePtr.pageNumParms.startPage # 1)
              THEN statePtr.pageNumParms.startPage ←
                  statePtr.pageNumParms.startPage + 1;
```

```
            wv ← LONG[statePtr.pageNumParms.startPage] +
                LONG[(IF (statePtr.pageNumParms.skipLastSheet)
THEN 0 ELSE 2)];
            IF (Inline.LongMult[numberOfPages,2] < wv)
                THEN {NULL; -- FUTURE LOCATION OF SIGNAL TO POST PARSE
SCHED IN ME1.1
                    -- Appearance Warning 162.
                -- SIGNAL Error[startPageBeyondEndPage[
                -- startPage: statePtr.pageNumParms.startPage,
                -- endPage: CARDINAL,
                -- pagesInJob: CARDINAL]]
                }

ELSE {pnDelta ← (LAST[LONG CARDINAL] -
                        Inline.LongMult[numberOfPages,2] +
                        LONG[statePtr.pageNumParms.startPage]
+
                        LONG[(IF
(statePtr.pageNumParms.skipLastSheet)
                                THEN 0 ELSE 2)]);

IF (pnDelta < statePtr.pageNumParms.startNum)
                    THEN ERROR
Error[[pageNumberTooLarge[tooBigByThisAmount:

(CARDINAL[statePtr.pageNumParms.startNum -
                                                pnDelta])]]];
                };
        };

IF statePtr.parameters.numberOfSegments = 0
    THEN statePtr.parameters.numberOfSegments ← 1;

IF statePtr.foldLine = horizontal
    OR statePtr.parameters.numberOfSegments > 1
    THEN statePtr.oneToN ← FALSE;

sheetCount ← (numberOfPages + pagesPerSheet - 1) / pagesPerSheet;
    segmentCount ← statePtr.parameters.numberOfSegments;

sheetsPerSegment ← (sheetCount + segmentCount - 1)/segmentCount;

statePtr.nextSheet.segmentNumber ←
        IF statePtr.oneToN THEN 1 ELSE
statePtr.parameters.numberOfSegments;

statePtr.nextSheet.sheetNumber ←
        IF statePtr.oneToN THEN 1 ELSE sheetsPerSegment;

statePtr.sheetsPerSegment ← sheetsPerSegment;

« Since output page size is constant, use page one's »
    statePtr.halfSheetX ← Inline.LongDiv
            [num: 507 + Inline.LongMult

[pageParms.medium.mediumDimensions.widthInMillimeters,6000],
            den: 508];
```

```
statePtr.halfSheetY ← Inline.LongDiv
        [num: 507 + Inline.LongMult

[pageParms.medium.mediumDimensions.lengthInMillimeters,6000],
        den: 508];

IF (absolutePositioning)
  THEN {[statePtr.pageFrameX, statePtr.pageFrameY] ←
GetPageFrameDims [
        paramsPtr: @statePtr.parameters,
        mediumDimensions:
pageParms.medium.mediumDimensions];
        }

ELSE IF (statePtr.foldLine = vertical)
  THEN {statePtr.pageFrameX ← statePtr.halfSheetX;
    statePtr.pageFrameY ← pageParms.medium.mediumDimensions.lengthInMillimeters;
        }

ELSE {statePtr.pageFrameY ← statePtr.halfSheetY;
    statePtr.pageFrameX ←
        pageParms.medium.mediumDimensions.widthInMillimeters;
        };

IF (((epsilon + statePtr.halfSheetX *
        (IF statePtr.foldLine = vertical THEN 1 ELSE 2)) <
        statePtr.parameters.trimSizeX) OR ((epsilon + statePtr.halfSheetY *
        (IF statePtr.foldLine = horizontal THEN 1 ELSE 2)) <
        statePtr.parameters.trimSizeY))
  THEN ERROR Error [[trimSizeTooBig[
    trimXPixels: statePtr.parameters.trimSizeX,
        trimYPixels: statePtr.parameters.trimSizeY]]];
  }; « InitializeInternal »

InitializeTargets: PROCEDURE [covers: JobQ.Covers,
  foreNo, rearNo, numPages, sheetNo, sheetsPerSegment: CARDINAL,
  oneToN: BOOLEAN]
  RETURNS [foreTarget, rearTarget: Page.SignatureTarget,
  mediaIndexFlag: BOOLEAN] =
  {IF (covers = none)
  THEN {-- Initialize for Single Segment Without Covers or
        -- MultiSegment Jobs»
        foreTarget ← SELECT foreNo FROM
                > numPages = > [none[]],
                    = 1  = > [first[]],
                = numPages = > [last[]],
                  ENDCASE = > [number[num: foreNo]];

rearTarget ← SELECT rearNo FROM
                > numPages = > [none[]],
                    = 1  = > [first[]],
                = numPages = > [last[]],
                  ENDCASE = > [number[num: rearNo]];
```

```
            medialndexFlag ← FALSE;
        }

ELSE IF (sheetNo = sheetsPerSegment AND NOT oneToN)
    THEN {-- Initialize the Cover of a Single Segment Job With Covers
        SELECT numPages FROM
                    0 = > {foreTarget ← [none[]];
                            rearTarget ← [none[]];
                          };

1 = > {foreTarget ← [first[]];
                            rearTarget ← [none[]];
                          };

ENDCASE = > {foreTarget ← [first[]];
                            rearTarget ← [last[]];
                        };

medialndexFlag ← TRUE;
        }

ELSE {-- Initialize for a nonCover page of a Single Segment Job
          -- With Covers or any page of a oneToN job
            foreTarget ←
            IF oneToN THEN
                SELECT foreNo FROM
                        > numPages-1 = > [none[]],
                            < = rearNo = > [none[]],
                            ENDCASE = > [number[num:foreNo]]
            ELSE
                SELECT foreNo FROM
                        > numPages-1 = > [none[]],
                            ENDCASE = > [number[num:foreNo]];

rearTarget ←
            IF oneToN THEN
                SELECT rearNo FROM
                        > numPages-1 = > [none[]],
                            ENDCASE = > [number[num:rearNo]]
            ELSE
                SELECT rearNo FROM
                        > numPages-1 = > [none[]],
                            < = foreNo = > [none[]],
                            ENDCASE = > [number[num:rearNo]];

medialndexFlag ← (oneToN AND sheetNo =
sheetsPerSegment);
            };
}; « InitializeTargets »

MakeSide: PROCEDURE [lockID: JobBackUp.LockID, side: Page.Side,
 statePtr: StatePtr] RETURNS [] =
{lFaultID: FaultLogger.ID;
 lImage: Image.Handle;
 lPage: Page.Handle;
 lSide: Page.Side;
```

```
ISubCode: CARDINAL;
IErrorType: {imageError, none, pageError, rasterDSError,
    rasterNotFound} ← none;
  {ENABLE
      BEGIN
          Image.Error = > {IErrorType ← IF (code = rasterNotFound)
                                  THEN rasterNotFound
                                                            ELSE imageError;
                                  ISubCode ← code.ORD;
                                  CONTINUE;
                          };

Page.Error = > {IErrorType ← pageError;
                  ISubCode ← code.ORD;
                                  CONTINUE;
                          };

RasterDirectorySupervisor.Error = > {IFaultID ←
faultID;
                                                                 IErrorType
  ← rasterDSError;
                                                                 CONTINUE;
                                                        };
      END;
```

We claim:

1. A process for printing signatures for at least one signature set in an electronic printing system, said set comprising a plurality of said signatures in succession with each of said successive signatures having a predetermined signature position in said set, said printing system producing prints of image pages from electronic pages composed of image signals and having a source of print media sheets for printing said image pages, said printing system further having programming means including a display screen for programming the system to produce said signatures, comprising the steps of:

a) electronically displaying print programming selections including programming selections for said signature set on said screen;

b) programming signature print instructions by actuating selected ones of said print programming selections;

c) providing electronic pages for printing said signatures;

d) ordering said electronic pages to print at least two of said image pages in an ordered side by side relation on at least one side of said print media sheets with said side by side image pages on each of said signatures printed separated from one another along a signature foldline in response to programming said signatures;

e) printing said ordered image pages on said print media sheets to provide said signatures;

f) adding a preset incremental distance by which the image pages on some of said signatures are separated from one another to avoid obscuring of part of the image pages on folding of said signatures along said signature foldline when forming said set;

g) applying said incremental distance to a second signature in said signature set;

h) for each successive signature in said set, multiplying said incremental distance by said predetermined signature position of each of said successive signatures in said set minus one; and j) applying the multiplied incremental distance from step h to each of said successive signatures in said signature set.

2. The process according to claim 1 including the step of:

scaling selected ones of said image pages relative to a selected one of said image pages to provide uniformly sized images on each of the signatures in said signature set.

3. The process according to claim 1 including the step of:

in response to programming printing of multiple signature sets for assembly as a book, adding a second additional preset incremental distance by which the image pages on some of said signatures are separated from one another to avoid obscuring of part of the image pages on assembly of said signature sets together to form a book.

4. The process according to claim 3 in which said book comprises a plurality of said sets in succession with each of said successive sets having a preset position in said book including the steps of:

a) applying said second incremental distance to a second signature set comprising said book;

b) for each one of successive sets in said book following said second signature set, multiplying said second incremental distance by said preset position of each of said successive sets in said book minus one to provide an adjusted incremental distance for each of said successive sets in said book; and c) applying the adjusted incremental distance from step b to each of said successive sets in said book.

5. A printing process for printing signatures in an electronic printing system, said system having a printer for producing prints from image signals, means to supply sheets of print media to said printer for making prints, and means for programming said system for print jobs including signature print jobs in which signatures are printed on said print media sheets to provide at least one signature set in which each of the signatures in said signature set has a predetermined location in said signature set, comprising the steps of:
- a) providing image signals in the form of electronic pages for making prints;
- b) in response to programming said system to print a signature print job, re-ordering said electronic pages to print at least two electronic pages in side by side relation on at least one side of each of said print media sheets for each signature printed;
- c) supplying said print media sheets to said printer for printing said signatures;
- d) printing said re-ordered electronic pages on said print media sheets to provide said signature set;
- e) programming the number of said electronic pages in said signature set;
- f) programming the number of said electronic pages on each signature;
- g) from steps e and f, determining the number of said print media sheets to be printed for said signature set;
- h) where the number of said electronic pages in said signature set is not evenly divided by the number of said electronic pages for each signature: determining the number of additional pages required to render the number of said pages in said signature set evenly divided by the number of said pages for each signature;
- i) adding said number of additional pages to the number of pages for each signature set;
- j) when printing said signatures, printing a blank page for each of said additional image pages;
- k) printing plural signature sets with said steps a)–j) for assembly with one another to form a book with each of the signature sets in said book having a preset location in said book; and
- l) when printing said signature sets, adjusting the position of predetermined ones of said electronic pages on said print media sheets in said signature sets in accordance with said preset location of said signature sets in said book.

* * * * *